United States Patent
Psaras et al.

(10) Patent No.: US 12,391,578 B2
(45) Date of Patent: Aug. 19, 2025

(54) TRIVALENT DOPED CERIUM OXIDE COMPOSITIONS FOR BIOLOGICAL CONTAMINANT REMOVAL

(71) Applicant: Neo Chemicals & Oxides, LLC, Greenwood Village, CO (US)

(72) Inventors: Dimitrios Psaras, Bound Brook, NJ (US); Mason Reames Haneline, Orange, CA (US); Steven P. Williams, London (GB)

(73) Assignee: NEO Chemicals & Oxides, LLC, Greenwood Village, CO (US)

( * ) Notice: Subject to any disclaimer, the term of this patent is extended or adjusted under 35 U.S.C. 154(b) by 547 days.

(21) Appl. No.: 17/895,942

(22) Filed: Aug. 25, 2022

(65) Prior Publication Data

US 2023/0070023 A1 Mar. 9, 2023

Related U.S. Application Data

(60) Provisional application No. 63/236,949, filed on Aug. 25, 2021.

(51) Int. Cl.
*C02F 1/28* (2023.01)
*B82Y 30/00* (2011.01)
(Continued)

(52) U.S. Cl.
CPC ............. *C02F 1/281* (2013.01); *B82Y 30/00* (2013.01); *C01F 17/235* (2020.01); *C02F 2101/30* (2013.01)

(58) Field of Classification Search
None
See application file for complete search history.

(56) References Cited

U.S. PATENT DOCUMENTS

| | | | |
|---|---|---|---|
| 3,980,763 | A | 9/1976 | Mullhaupt |
| 4,714,694 | A | 12/1987 | Wan et al. |

(Continued)

FOREIGN PATENT DOCUMENTS

| | | |
|---|---|---|
| CN | 114350127 A | 4/2022 |
| CN | 114410086 A | 4/2022 |

(Continued)

OTHER PUBLICATIONS

Swanand Patil, Sudipta Seal, Yu Guo, Alfons Schulte, John Norwood; Role to trivalent La and Nd dopants in lattice distortion and oxygen vacancy generation in cerium oxide nanoparticles. Appl. Phys. Lett. Jun. 12, 2006; 88 (24): 243110. https://doi.org/10.1063/1.2210795 (Year: 2006).*

(Continued)

*Primary Examiner* — Chester T Barry
(74) *Attorney, Agent, or Firm* — Melissa M. Hayworth; George C. Lewis; Merchant & Gould, P.C.

(57) ABSTRACT

A particulate oxide composition comprising cerium oxide, trivalent dopant, and optional additional metal oxide, other than cerium oxide and trivalent dopant, is beneficial to aid in the removal of biological contaminants, such as bacteria, viruses, fungi, protozoa (e.g., amoebae), yeast and algae. This particulate oxide composition contains more cerium oxide than trivalent dopant and has a unique depth profile in which the average trivalent dopant to Ce ratio at about 0 nm to about 3.5 nm from the surface of the particulate composition is greater than the trivalent dopant to Ce ratio at about 15 nm from the surface of the particulate composition. These trivalent doped cerium oxide compositions can be used to remove these biological contaminants from fluids, including air and water, and from solid surfaces. Also described are methods of using compositions containing these trivalent (Continued)

doped cerium oxide compositions to remove biological contaminants.

25 Claims, 12 Drawing Sheets

(51) Int. Cl.
*C01F 17/235* (2020.01)
*C02F 101/30* (2006.01)

(56) References Cited

U.S. PATENT DOCUMENTS

| | | | |
|---|---|---|---|
| 2009/0107925 A1 | 4/2009 | Burba | |
| 2009/0112043 A1 | 4/2009 | Burba | |
| 2017/0087513 A1 | 3/2017 | Chandler et al. | |
| 2017/0333877 A1* | 11/2017 | Titlbach | B01J 35/613 |
| 2021/0115301 A1 | 4/2021 | Chang | |
| 2022/0374014 A1 | 11/2022 | Xu et al. | |
| 2023/0035362 A1* | 2/2023 | Psaras | C01F 17/235 |
| 2023/0240303 A1 | 8/2023 | Sekiguchi et al. | |
| 2024/0225008 A1* | 7/2024 | Psaras | C08K 3/105 |
| 2024/0292842 A1 | 9/2024 | Haneline | |

FOREIGN PATENT DOCUMENTS

| | | |
|---|---|---|
| CN | 115197544 A | 10/2022 |
| EP | 2502959 A1 | 9/2012 |
| WO | 2014078884 A1 | 5/2014 |
| WO | 2015197656 A1 | 12/2015 |
| WO | 2021241490 A1 | 12/2021 |
| WO | 2023004013 A1 | 1/2023 |
| WO | 2023028267 A1 | 3/2023 |

OTHER PUBLICATIONS

Knoblauch, N.; Simon, H.; Dörrer, L.; Uxa, D.; Beschnitt, S.; Fielitz, P.; Wendelstorf, J.; Spitzer, K.H.; Schmücker, M.; Borchardt, G. Ceria: Recent Results on Dopant-Induced Surface Phenomena, Inorganics 2017, 5, 76. https://doi.org/10.3390/inorganics5040076 (Year: 2017).*
J. Iqbal, et al., "Synthesis of Nitrogen-Doped Ceria Nanoparticles in Deep Eutectic Solvent for the Degradation of Sulfamethaxazole Under Solar Irradiation and Additional Antibacterial Activities", Science Direct; Chemical Engineering Journal, vol. 394, Aug. 15, 2020, 124869, 6 pgs.
P. T. Shibeshi, et al., "Study of Fe-Doped and Glucose-Capped CeO2 Nanoparticles Synthesized by Co-Precipitation Method", Science Direct; Chemical Physics, vol. 561, Sep. 1, 2022, 111617, 5 pgs.
C. Welch, "IRGAGUARD B5000", XP055565697, https://www3.epa.gov/pesticides/chem_search/ppls/040810-00018-20060421.pdf; Apr. 21, 2006; 9 pgs.
L. A. Casemiro, et al., "Antimicrobial and Mechanical Properties of Acrylic Resins with Incorporated Silver-Zinc Zeolite—Part 1", Gerodontology; DOI: 10.111/j.1741-2358.2007.00198.x; Sep. 2008; 25(3): pp. 187-194.
R. Kirkgeçit, et al., "Investigation of Photochemical Properties of La—Er/CeO2 and La—Y/CeO2 Composites", Journal of Photochemistry & Photobiology, A: Chemistry, DOI: 10.1016/J.Jphotochem.2021.113602; 423 (2022), 113602, pp. 1-12.
I. Shajahan, et al., "Praseodymium Doped Ceria as Electrolyte Material for IT-SOFC Applications", Materials Chemistry and Physiscs, DOI: 10.1016/J.Matchemphys.2018.05.078; 216 (2018), pp. 136-142.
F. Li, et al., "Ruthenium Complexes as Antimicrobial Agents", Chem Soc Rev, Royal Society of Chemistry, DOI: 10.1039/c4cs00343h; 2015, 44, pp. 2529-2542.
Z. U. İyigündodu, et al., "Development of Durable Antimicrobial Surfaces Containing Silver-and Zinc-Ion-Exchanged Zeolites", Turkish Journal of Biology, vol. 38, No. 3, Article 14, 2014, 9 pgs.
Toray Press Release "Toray Develops Antiviral Particles that Deactivate Viruses around 100 Times Faster than Conventional Counterparts", Toray Industries, May 26, 2022 https://www.toray.com/global/news/details/20220524113252.html.
C. Noël, et al., "ToF-SIMS Depth Profiling of Organic Delta Layers with Low-Energy Cesium Ions: Depth Resolution Assessment", J. American Society for Mass Spectrometry, 2019 30:1537-1544.
A. Hakim, et al., "Temperature Programmed Desorption of Carbon Dioxide for Activated Carbon Supported Nickel Oxide: The Adsorption and Desorption Studies", Advanced Materials Research, vol. 1087, (2015), pp. 45-49.
N. W. Hurst, et al., "Temperature Programmed Reduction", Catalysis Reviews Science and Engineering, 1982, 24:2, pp. 233-309.
International Search Report and Written Opinion issued in PCT/US2022/041587 mailed Dec. 6, 2022.
Stefanik, Todd S., et al., "Nonstoichiometry and Defect Chemistry in Praseodymium-Cerium Oxide", Journal of Electroceramics, Kluwer Academic Publishers, BO, vol. 13, No. 1-3, Jul. 1, 2004, pp. 799-803.
Magdalane, Maria, C., et al., "Facile synthesis of heterostructured cerium oxide/yttrium oxide nanocomposite in UV ight induced photocatalytic degradation and catalytic reduction: Synergistic effect of antimicrobial studies", Journal of Photochemistry and Photobiology, B: Biology, Elsevier Science S.A., Basel, CH, vol. 173, May 20, 2017, pp. 23-34.
Rahdar Abbas et al., "Gum-based cerium oxide nanoparticles for antimicrobial assay", Applies Physics A., Springer Berlin Heidelberg, vol. 126, No. 5, Apr. 7, 2020, abstract.

\* cited by examiner

TRIVALENT DOPED CERIUM OXIDE COMPOSITIONS FOR BIOLOGICAL CONTAMINANT REMOVAL

RELATED APPLICATION

This application claims priority to and benefit of U.S. Provisional Application No. 63/236,949 filed Aug. 25, 2021, the contents of which are hereby incorporated by reference in their entirety.

FIELD OF THE INVENTION

This disclosure relates to novel trivalent doped cerium oxide ($CeO_2$) particulate compositions and the use of trivalent doped cerium oxide ($CeO_2$) compositions for biological contaminant removal. These compositions can be used as antimicrobial/antibacterial/antiviral agents. As such, these compositions have uses for removing bacteria, viruses, protozoa (e.g., amoebae), fungi (e.g., mold), algae, yeast, and the like. In particular, these compositions can be used in methods for treating fluids, including liquids or air, and solid surfaces through contact.

INTRODUCTION

This disclosure generally relates to particulate oxide compositions comprising trivalent doped $CeO_2$ and the use of trivalent doped cerium oxide ($CeO_2$) compositions for removing bacteria, viruses, and other microbial contaminants through contact. As such, compositions containing these trivalent doped $CeO_2$ species can remove biological contaminants from air and aqueous liquid streams and can particularly remove bacteria and viruses from air and water whether the microbes are in high or very low concentrations. These novel trivalent doped cerium oxide particulate compositions have unique physical/structural and electrochemical properties that make them useful for these important purposes.

Various technologies have been used to remove biological contaminants from air and aqueous systems. Examples of such techniques include adsorption on high surface area materials, such as alumina, filters with pore sizes smaller than the biological contaminants, and the use of highly oxidative materials such as chlorine and bromine. Certain metals have also found use because they exhibit the oligodynamic effect which is the biocidal effect of metals. Metals known to exhibit the oligodynamic effect are Al, Sb, As, Ba, Si, B, Cu, Au, Pb, Hg, Ni, Ag, Th, Sn, and Zn. Incorporation of these into technologies for air or aqueous system treatment remains a challenge as the toxicity towards human and animal life and the cost are major concerns.

The need for effective and inexpensive antimicrobial materials to remove bacteria, viruses, and other microbial contaminants, from fluids, including air, water, and other aqueous systems, remains.

SUMMARY

This disclosure relates generally to novel trivalent doped cerium oxide compositions and the use of those compositions for removing biological contaminants.

The trivalent doped cerium oxide compositions are described herein as particulate oxide compositions. The particulate oxide compositions comprises cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant and wherein the average trivalent dopant to Ce ratio at about 0 nm to about 3.5 nm from the surface of the particulate oxide composition is greater than the trivalent dopant to Ce ratio at about 15 nm from the surface of the particulate composition.

In particular embodiments, the average trivalent dopant to Ce ratio at about 0 nm to about 3.5 nm from the surface of the particulate composition is about 10% to about 250% greater than the trivalent dopant to Ce ratio at about 15 nm from the surface of the particulate oxide composition. In other embodiments, the average trivalent dopant to Ce ratio at about 0 nm to about 3.5 nm from the surface of the particulate composition is about 15% to about 250% greater than the trivalent dopant to Ce ratio at about 15 nm from the surface of the particulate oxide composition.

In certain embodiments of these particulate oxide compositions, the particulate oxide comprises cerium oxide in an amount of about 99.9 wt % to about 20 wt % based on the total weight of the particulate oxide composition; trivalent dopant in an amount of about 0.1 wt % up to about 50 wt % based on the total weight of the particulate oxide composition; and additional metal oxide in an amount of about 70 wt % to about 0 wt % based on the total weight of the particulate oxide composition.

In other embodiments of these particulate oxide compositions, the particulate oxide comprises cerium oxide in an amount of about 99.9 wt % to about 50 wt % based on the total weight of the particulate oxide composition; and trivalent dopant in an amount of about 0.1 wt % up to about 50 wt % based on the total weight of the particulate oxide composition.

The particulate oxide compositions have biological contaminant removal properties, and as such, has uses for removing bacteria or viruses from fluids, including air and water, and/or from surfaces. The biological contaminants to be removed include bacteria, viruses, protozoa (e.g., amoebae), fungi (e.g., mold or fungus), and the like.

Also disclosed herein are supported compositions comprising a support material and the particulate oxide compositions. The supported composition has biological contaminant removal properties, and as such, has uses for removing bacteria or viruses from fluids, including air and water, and/or from surfaces. The biological contaminants to be removed include bacteria, viruses, protozoa (e.g., amoebae), fungi (e.g., mold or fungus), and the like.

The supported compositions for removing biological contaminants as disclosed herein comprises a support material comprising an organic polymer, cotton, glass fiber, or mixtures thereof; and a particulate oxide composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant and wherein the average trivalent dopant to Ce ratio at about 0 nm to about 3.5 nm from the surface of the particulate oxide composition is greater than the trivalent dopant to Ce ratio at about 15 nm from the surface of the particulate composition. In these supported compositions, the particulate oxide composition is deposited on or within the support material.

In specific embodiments, these supported compositions comprise about 0.5 to about 80 weight % particulate oxide composition based on the total weight of the supported composition.

The supported composition containing the support material and particulate oxide composition is in a rigid or elastic form and this supported composition can be made into an article for removing biological contaminants, such as a filter, a fixed bed filter system, a plastic or glass bottle or container, a plastic or glass touch surface, and the like.

In one embodiment, a plastic article is disclosed. This plastic article comprises: a supported composition for removing biological contaminants comprising (i) an organic polymer selected from the group consisting of polyethylene, polyvinyl chloride, nylon, polypropylene, polyester, polyurethane, polyamide, polyolefin, polycarbonate, copolymers thereof, and mixtures thereof; and (ii) a particulate oxide composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant and wherein the average trivalent dopant to Ce ratio at about 0 nm to about 3.5 nm from the surface of the particulate oxide composition is greater than the trivalent dopant to Ce ratio at about 15 nm from the surface of the particulate composition, wherein the particulate oxide composition is deposited on or within the organic polymer; and wherein the plastic article comprises about 50 to about 100 weight percent of the supported composition for removing biological contaminants based on the total weight of the plastic article. The plastic article can be a filter, a fixed bed filter system, a plastic bottle or container, a plastic touch surface, a plastic doorknob or handle cover, a plastic elevator button cover, and the like.

The particulate oxide compositions per se, the supported compositions, and the articles can be used in methods for removing biological contaminants. These biological contaminants include bacteria, viruses, protozoa (e.g., amoebae), fungi (e.g., mold or fungus), and the like.

In one embodiment the method for removing biological contaminants comprises: (i) providing a particulate oxide composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant and wherein the average trivalent dopant to Ce ratio at about 0 nm to about 3.5 nm from the surface of the particulate oxide composition is greater than the trivalent dopant to Ce ratio at about 15 nm from the surface of the particulate composition; (ii) contacting the particulate composition with a biological contaminant wherein the biological contaminant is selected from the group consisting of bacteria, viruses, fungi, protozoa (e.g., amoebae), and mixtures thereof; and (iii) removing at least about 90% of the biological contaminant through contact with the composition. In some embodiments, the particulate oxide composition is contained within a filter material or a plastic.

In certain embodiments the methods treat an aqueous stream and the biological contaminant is in the aqueous stream. In other embodiments, the methods treat a gaseous stream and the biological contaminant is in the gaseous stream. In yet other embodiments, the contacting is through touch of a solid to the composition and thus treat a solid surface through touch. In certain of these embodiments, the contacting is through touch of a solid to an article comprising the particulate oxide composition.

In specific embodiments of treating a gaseous or aqueous stream, the methods may further comprise a step of setting a target concentration of biological contaminant. In these embodiments, a biological contaminant may be identified and a target concentration for that biological contaminant may be set. The methods additionally may comprise a step of monitoring the treated stream for the biological contaminant.

In a certain embodiment, these methods are for removing biological contaminants from fluid or are methods for treating a fluid. In these embodiments, the fluid may be a gaseous or aqueous stream. In these embodiments, the methods comprise (i) providing a particulate oxide composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant and wherein the average trivalent dopant to Ce ratio at about 0 nm to about 3.5 nm from the surface of the particulate oxide composition is greater than the trivalent dopant to Ce ratio at about 15 nm from the surface of the particulate composition; (ii) contacting a fluid containing biological contaminant with the particulate oxide composition, wherein the biological contaminant is selected from the group consisting of bacteria, viruses, fungi (e.g., mold), protozoa (e.g., amoebae), and mixtures thereof; and (iii) removing biological contaminant from the fluid through contact with the particulate oxide composition. The biological contaminant can be removed in an amount of 90% or more. When the fluid is a liquid, the particulate oxide composition may be used per se and the method may further comprise filtering the fluid/liquid.

In specific embodiments, these methods are for removing biological contaminants from fluid or are methods for treating a fluid. In these embodiments, the fluid may be a gaseous or aqueous stream. In these embodiments, the methods comprise (i) providing a supported composition comprising (a) a support material comprising an organic polymer, cotton, glass fiber, or mixtures thereof and (b) a particulate oxide composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant and wherein the average trivalent dopant to Ce ratio at about 0 nm to about 3.5 nm from the surface of the particulate oxide composition is greater than the trivalent dopant to Ce ratio at about 15 nm from the surface of the particulate composition; (ii) contacting a fluid containing biological contaminant with the supported composition, wherein the biological contaminant is selected from the group consisting of bacteria, viruses, fungi (e.g., mold), protozoa (e.g., amoebae), and mixtures thereof; and (iii) removing biological contaminant from the fluid through contact with the supported composition. The biological contaminant can be removed in an amount of 90% or more.

In other embodiments for removing biological contaminants from fluid (e.g., a gaseous or aqueous stream), the methods comprise (i) providing a supported composition comprising (a) a support material comprising an organic polymer, cotton, glass fiber, or mixtures thereof and (b) a particulate oxide composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant and wherein the average trivalent dopant to Ce ratio at about 0 nm to about 3.5 nm from the surface of the particulate oxide composition is greater than the trivalent dopant to Ce ratio at about 15 nm from the surface of the particulate composition; (ii) contacting a gaseous or aqueous stream containing biological contaminant with the supported composition, wherein the biological contaminant is selected from the group consisting of bacteria, viruses, fungi (e.g., mold), protozoa (e.g., amoebae), and mixtures thereof; and (iii) removing biological contaminant from the gaseous or aqueous stream through contact with the supported composition. The biological contaminant can be removed in an amount of 90% or more. These methods may further comprise monitoring for the biological contaminant after contacting. The monitoring may be done by sampling or may be continuous.

These methods of treating a fluid or a gaseous or aqueous stream may further comprise a step of setting a target concentration of biological contaminant. In these methods a biological contaminant of interest is identified and then a target concentration for that biological contaminant is set. The methods additionally may comprise a step of monitoring the biological contaminant in the treated stream. The monitoring may be done by sampling or may be continuous.

In methods of treating aqueous streams, the particulate oxide composition may be used per se by slurrying with the aqueous stream. These methods including slurrying may further comprise a step of filtering.

In specific embodiments, the methods comprise the steps of (i) providing a supported composition comprising (a) a support material comprising an organic polymer, cotton, glass fiber, or mixtures thereof and (b) a particulate oxide composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant and wherein the average trivalent dopant to Ce ratio at about 0 nm to about 3.5 nm from the surface of the particulate oxide composition is greater than the trivalent dopant to Ce ratio at about 15 nm from the surface of the particulate composition; (ii) setting a target concentration of a biological contaminant; (iii) contacting a gaseous or aqueous stream containing biological contaminant with the supported composition and removing biological contaminant through contact with the supported composition to provide a treated stream; and (iv) monitoring the treated stream for the biological contaminant, wherein the biological contaminant is selected from the group consisting of bacteria, viruses, fungi (e.g., mold), protozoa (e.g., amoebae), and mixtures thereof. The target concentration can be set at a certain amount of contaminant (e.g., virus, bacteria, protozoa/amoebae, or fungi) or can be set at the limit of detection.

DETAILED DESCRIPTION

Figure 1:
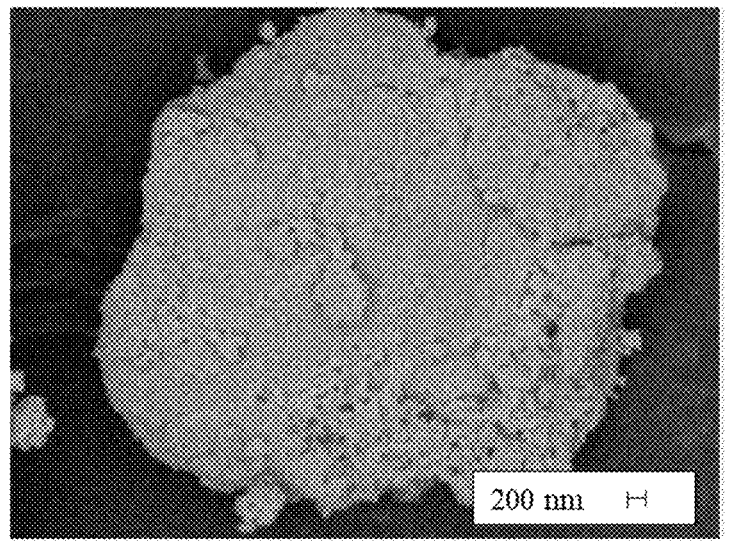
FIG. 1 is an SEM image of the composition of Example 1 with a scale bar of 200 nm.

Before the compositions, articles, and methods are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise. Thus, for example, reference to "a trivalent dopant" is not to be taken as quantitatively or source limiting, reference to "a step" may include multiple steps, reference to "producing" or "products" of a reaction or treatment should not be taken to be all of the products of a reaction/treatment, and reference to "treating" may include reference to one or more of such treatment steps. As such, the step of treating can include multiple or repeated treatment of similar materials/streams to produce identified treatment products.

Singular forms of the biological contaminants also include plural referents. For example, "amoeba" and "virus" include reference to "amoebae" and "viruses", respectively.

Numerical values with "about" or "approximately" include typical experimental variances. As used herein, the terms "about" and "approximately" are used interchangeably and mean within a statistically meaningful range of a value, such as a stated weight percentage, surface area, concentration range, time frame, distance, molecular weight, temperature, pH, and the like. Such a range can be within an order of magnitude, typically within 10%, and even more typically within 5% of the indicated value or range. Sometimes, such a range can be within the experimental error typical of standard methods used for the measurement and/or determination of a given value or range. The allowable variation encompassed by the term "about" will depend upon the particular system under study, and can be readily appreciated by one of ordinary skill in the art. Whenever a range is recited within this application, at least every whole number integer within the range is also contemplated as an embodiment of the invention.

The present disclosure relates to trivalent doped $CeO_2$ particulate compositions having activity for removing biological contaminants and to their use for biological contaminant removal. The trivalent doped $CeO_2$ particulate compositions are primarily mixed oxides of Ce and the trivalent dopant. In certain embodiments, the trivalent doped $CeO_2$ particulate compositions contain an amount of additional metal oxide. The trivalent doped $CeO_2$ particulate compositions disclosed herein can be used as a slurry or in supported compositions and/or articles that are intended to remove biological contaminants and in methods for removing biological contaminants. These biological contaminants include bacteria, viruses, fungi, protozoa (e.g., amoebae), yeast, and mixtures thereof.

These trivalent doped $CeO_2$ compositions are described herein as particulate oxide compositions. As such, the particulate oxide compositions as disclosed comprise cerium oxide and one or more trivalent dopants. The particulate oxide compositions optionally may comprise additional metal oxides, other than the cerium oxide and trivalent dopant, and/or trace amounts of impurities. In certain embodiments, the particulate oxide composition contains about zero additional metal oxides. The particulate oxide compositions as disclosed herein exhibit activity for removing/reducing biological contaminants.

The cerium of the cerium oxide in the particulate oxide composition is Ce(IV). The trivalent rare earth dopants can be selected from the group consisting of yttrium (Y), lanthanum (La), neodymium (Nd), praseodymium (Pr), samarium (Sm), europium (Eu), gadolinium (Gd), terbium (Tb), dysprosium (Dy), holmium (Ho), erbium (Er), thulium (Tm), ytterbium (Yb), lutetium (Lu), cerium (Ce), and mixtures thereof. In certain embodiments, the trivalent dopant is yttrium (Y), lanthanum (La), neodymium (Nd), praseodymium (Pr), and mixtures thereof, and in particular embodiments, the trivalent dopant is Nd, La, or a mixture thereof. In other embodiments, the trivalent dopant is La. In additional embodiments, the trivalent dopant is Pr. As described, the trivalent dopant is present within the particulate composition as an oxide so that the particulate oxide composition comprises a mixed oxide of at least cerium and trivalent dopant. The trivalent dopant is present in a minority amount in comparison to the cerium oxide, and as such, the particulate oxide compositions contain more cerium oxide than trivalent dopant.

The particulate oxide composition optionally may contain additional metal oxides, other than the cerium oxide and trivalent dopant. These additional metal oxides may be selected from the group consisting of aluminum (Al), titanium (Ti), zirconium (Zr), hafnium (Hf), and mixtures thereof.

As such, the disclosed particulate oxide composition is a mixed oxide composition (i.e., a mixture of oxides of at least cerium and trivalent dopant). The composition also is identified herein as a trivalent doped cerium oxide, and when identified as such, it is a mixed cerium lanthanum oxide, but this description does not exclude the additional metal oxides, unless it is identified that the composition contains about zero additional metal oxides, other than the cerium and trivalent dopant.

In certain embodiments of the particulate oxide composition, the trivalent dopant is La and the particulate oxide composition does contain about zero additional metal oxides. In these embodiments, the particulate oxide composition is a mixed cerium lanthanum oxide (or a La doped cerium oxide).

The particulate oxide composition as disclosed herein comprises the trivalent dopant in an amount of about 0.1 wt % up to about 50 wt % based on the total weight of the particulate oxide composition. As stated above, the trivalent dopant is present in a minority amount in comparison to the cerium oxide. In certain embodiments, the particulate oxide composition contains the trivalent dopant in an amount of about 0.5 wt % to about 40 wt % or in an amount of about 1 wt % to about 40 wt % based on the total weight of the particulate oxide composition. In particular embodiments, the particulate oxide composition contains the trivalent dopant in an amount of about 2 wt % to about 35 wt % or in an amount of about 2 wt % to about 30 wt % based on the total weight of the particulate oxide composition. In additional embodiments, the particulate oxide composition contains the trivalent dopant in an amount of about 2 wt % to about 25 wt % or in an amount of about 5 wt % to about 20 wt % based on the total weight of the particulate oxide composition. In specific of these embodiments, the particulate oxide composition contains the trivalent dopant in an amount of about 15 wt % based on the total weight of the particulate oxide composition. In certain of any of the above described embodiments, the trivalent dopant is lanthanum and the particulate oxide composition is cerium oxide doped with lanthanum (i.e., a mixed oxide of cerium and lanthanum).

In embodiments where the particulate oxide composition contains a cerium oxide, one or more trivalent dopants, and about zero additional metal oxide, the amount of cerium oxide will correspond to and vary with the amount of trivalent dopant so that the total amount of the trivalent dopant and cerium oxide is about 100% of the particulate composition. In certain of these embodiments with about zero additional metal oxide, the trivalent dopant is lanthanum and the particulate oxide composition is cerium oxide doped with lanthanum.

In the particulate oxide compositions, the cerium oxide is present in an amount greater than trivalent dopant. The particulate oxide composition as disclosed herein generally comprises the cerium oxide in an amount of about 99.9 wt % to about 20 wt % based on the total weight of the particulate oxide composition. In certain embodiments, the particulate oxide composition contains the cerium oxide in an amount of about 99.5 wt % to about 25 wt % or in an amount of about 99 wt % to about 30 wt % based on the total weight of the particulate oxide composition. In particular embodiments, the particulate oxide composition contains the cerium oxide in an amount of about 98 wt % to about 65 wt % or in an amount of about 98 wt % to about 70 wt % based on the total weight of the particulate oxide composition. In additional embodiments, the particulate oxide composition contains the cerium oxide in an amount of about 98 wt % to about 75 wt % or in an amount of about 95 wt % to about 80 wt % based on the total weight of the particulate oxide composition. In specific of these embodiments, the particulate oxide composition contains the cerium oxide in an amount of about 85 wt % based on the total weight of the particulate oxide composition. The amount of cerium oxide will vary with and correspond to the amount of trivalent dopant, and any amount of optional additional metal oxide, so that the total amount is about 100% of the particulate composition.

In specific embodiments, the particulate oxide composition comprises about zero wt % additional metal oxides, and in these embodiments, the particulate oxide composition comprises the cerium oxide in an amount to provide about 100% of the particulate composition based on the weight % of trivalent dopant. For example, in embodiments containing the trivalent dopant in an amount of about 0.1 wt % up to about 50 wt % based on the total weight of the particulate oxide composition, the composition contains cerium oxide in an amount of about 99.9 wt % to about 50 wt %. In an embodiment containing the trivalent dopant in an amount of about 1 wt % to about 40 wt % based on the total weight of the particulate oxide composition, the composition contains cerium oxide in an amount of about 99 wt % to about 60 wt %. In an embodiment containing the trivalent dopant in an amount of about 2 wt % to about 30 wt % based on the total weight of the particulate oxide composition, the composition contains cerium oxide in an amount of about 98 wt % to about 70 wt %, and the like.

The particulate oxide composition optionally may contain additional metal oxides other than the cerium oxide and trivalent dopant. These additional metal oxides may be selected from the group consisting of aluminum (Al), titanium (Ti), zirconium (Zr), hafnium (Hf), and mixtures thereof. The particulate oxide composition as disclosed herein generally comprises the additional metal oxide in an amount of about 70 wt % to about 0 wt % based on the total weight of the particulate oxide composition.

In certain embodiments, the particulate oxide comprises cerium oxide in an amount of about 99.9 wt % to about 20 wt % based on the total weight of the particulate oxide composition; trivalent dopant in an amount of about 0.1 wt % up to about 50 wt % based on the total weight of the particulate oxide composition; and additional metal oxide in an amount of about 70 wt % to about 0 wt % based on the total weight of the particulate oxide composition. In the particulate oxide composition, the cerium oxide is present in an amount greater than trivalent dopant.

When present, the particulate oxide composition generally comprises these additional metal oxides in an amount of about 70 wt % to about 0.1 wt % based on the total weight of the particulate oxide composition. In certain embodiments, the particulate oxide composition contains these additional metal oxides in an amount of about 50 wt % to about 0.1 wt % or in an amount of about 30 wt % to about 0.1 wt % based on the total weight of the particulate oxide composition. In certain embodiments, the particulate oxide composition contains these additional metal oxides in an amount of about 10 wt % to about 0.1 wt % based on the total weight of the particulate oxide composition. In specific embodiments, the particulate oxide composition contains about zero wt % additional metal oxides. The amount of additional metal oxide will vary with and correspond to the amount of trivalent dopant and cerium oxide so that the total amount is about 100% of the particulate composition.

In one embodiment, the particulate oxide composition comprises trivalent dopant in an amount of about 2 wt % to about 25 wt % based on the total weight of the particulate oxide; cerium oxide in an amount of about 20 wt % to about 30 wt %; and additional metal oxide in an amount of about 45 wt % to about 75 wt %. In the particulate oxide compositions, the cerium oxide is present in an amount greater than trivalent dopant and the amounts of the components will vary and correspond so that the total amount is about 100% of the particulate composition.

In an alternative embodiment, the particulate oxide composition comprises trivalent dopant in an amount of about 2 wt % to about 25 wt % based on the total weight of the particulate oxide; cerium oxide in an amount of about 45 wt % to about 75 wt %; and additional metal oxide in an amount of about 20 wt % to about 30 wt %. In the particulate oxide compositions, the cerium oxide is present in an amount greater than trivalent dopant and the amounts of the components will vary and correspond so that the total amount is about 100% of the particulate composition.

The particulate oxide composition optionally may further contain impurities in a minor amount. These impurities are typically present in an amount of about 1% by weight or less (to about zero or to an amount that is undetectable) based on the total weight of the particulate oxide composition. These impurities include residual solvents, salts, other metals, and the like. These other metals include those commonly found in water, such as magnesium, iron, calcium, silicon, sodium, and the like. These impurity amounts (of about 1% by weight to about zero or to an amount that is undetectable) may be present in any of the above and below described embodiments of the particulate oxide compositions. When present and detectable, any impurities are generally present in an amount of about 100 ppm or less.

The novel trivalent doped cerium oxide particulate compositions made by the methods as described infra have unique structural (i.e., physical) and electrochemical properties that make them particularly useful for the important purposes of removing biological contaminants.

The novel particulate oxide compositions as disclosed herein have a unique depth profile for the distribution of the cerium oxide and the trivalent dopant. This unique depth profile means that there is a higher ratio of trivalent dopant to Ce closer to the surface of the particulate oxide composition in comparison to deeper within the particulate oxide composition. Without wishing to be bound by any theory, the unique depth profile for the particulate oxide compositions may provide improved activity for removing biological contaminants.

One of skill in the art recognizes that these particulate oxide compositions have a surface, and this surface is referred to as at about 0 nm. One of skill in the art understands how to measure the Ce and trivalent dopant from this surface (i.e., at 0 nm) to depths (measured in nm) within the particulate oxide composition and from this measurement can calculate trivalent dopant to Ce ratios and an average trivalent dopant to Ce ratio at different depths.

Figure 8:
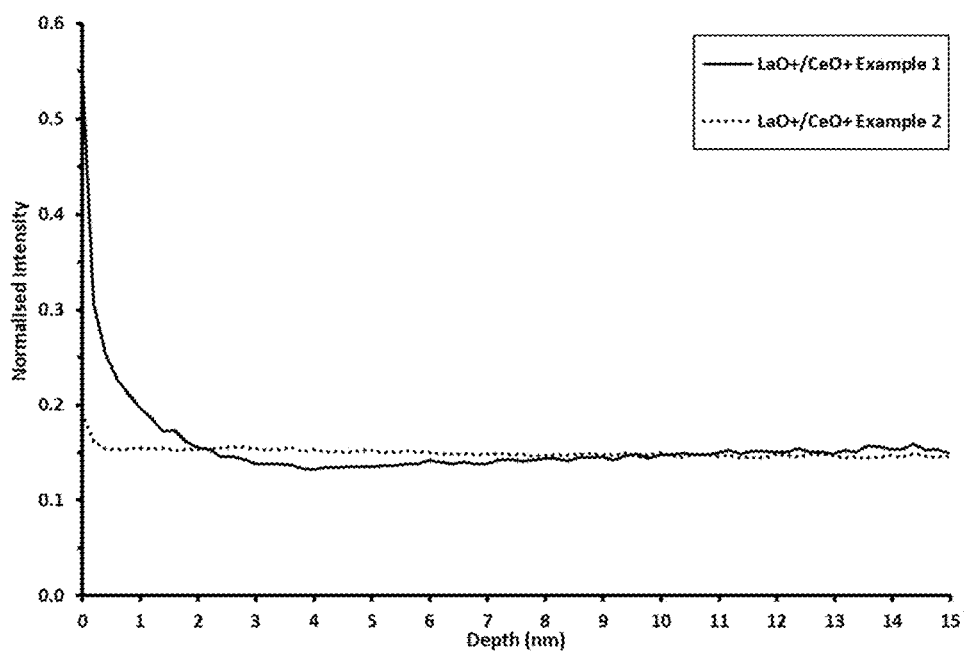
FIG. 8 is a graph of the ratio of $LaO^+/CeO^+$ vs depth for the composition of Example 1 and the composition of Example 2.

The unique depth profile of the particulate oxide composition is characterized such that the average trivalent dopant to Ce ratio at about 0 nm (i.e., the surface) to about 3.5 nm from the surface of the particulate oxide composition is greater than the trivalent dopant to Ce ratio at about 15 nm from the surface of the particulate oxide composition. Measurements of the Ce and trivalent dopant are taken at certain intervals from 0 nm (i.e., the surface) to about 3.5 nm and then averaged. Measurement of the Ce and trivalent dopant is also taken at about 15 nm from the surface of the particulate composition. FIG. 8 is a graph of the ratio of $LaO^+/CeO^+$ vs depth and demonstrates this unique depth profile for one example particulate oxide composition.

The depth profile for the distribution of cerium oxide and trivalent dopant is measured by Time of Flight (ToF) Secondary Ion Mass Spectrometry (SIMS) Depth profilometry as described in Noël, C. et al. *ToF-SIMS Depth Profiling of Organic Delta Layers with Low-Energy Cesium Ions: Depth Resolution Assessment*, Journal of The American Society for Mass Spectrometry, Vol. 30 (2019) pp 1537-1544, the contents of which are incorporated by reference in their entirety. As one of skill in the art understands, a square section of a particle of the sample material is chosen and analyzed by ToF-SIMS which yields the analysis at a depth of 0 nm (i.e., at the surface). ToF-SIMS works by bombarding the target material with an ion beam, which causes the material to sputter. Sputtering is a phenomenon where microscopic particles are ejected from the surface of a solid material. The ejected particles are then analyzed by mass in the mass spectrometer. The ion source for the ToF-SIMS analysis in this disclosure was a cesium ion source run at 2 keV with a target current of 130 nA; the sputtering size was 500 $\mu m^2$; the analysis area was 200 $\mu m^2$, 2 frames analysis followed by 6 frames sputter, and 60 seconds sputter time. The selected square section is then etched with an ion beam to remove the surface atoms. In this disclosure, a primary ion beam was a bismuth liquid metal ion gun run at 30 keV with pulsed target current of approximately 0.6 pA; the sputtering size was 250 $\mu m^2$; the analysis area was 100 $\mu m^2$, 2 frames analysis followed by 50 frames sputter, and 20,000 seconds sputter time. The time of the etching is correlated to the depth of the etching, and thus the depth can be controlled. In this disclosure, the sputter depth was calibrated to 1 nm/s. The exposed surface is then reanalyzed by ToF-SIMS to give the analysis at the new depth. The particulate composition can be analyzed in any increments of nm, for example, in increments of about 0.2 nm, increments of about 0.5 nm, increments of about 1 nm, and the like. This process is repeated until the desired depth is obtained. The observed mass spectrometry data is then correlated to the depth at which it was collected. For the present disclosure, it is important to determine the ratio of trivalent dopant to Ce, and thus, this is the reported data.

The novel particulate oxide composition as disclosed herein comprises cerium oxide, trivalent dopant selected from the group consisting of yttrium (Y), lanthanum (La), neodymium (Nd), praseodymium (Pr), and mixtures thereof, and optionally an additional metal oxide selected from the group consisting of aluminum (Al), titanium (Ti), zirconium (Zr), hafnium (Hf), and mixtures thereof, wherein the cerium oxide is present in an amount greater than the trivalent dopant and wherein the average trivalent dopant to Ce ratio at about 0 nm to about 3.5 nm from the surface of the particulate composition is greater than the trivalent dopant to Ce ratio at about 15 nm from the surface of the particulate oxide composition. In one embodiment of this particulate oxide composition, the composition comprises about 0.1 wt % up to about 50 wt % trivalent dopant. In a certain embodiment, the composition further comprises about 99.9 wt % to about 50 wt % cerium oxide based on the total weight of the particulate oxide composition.

Another embodiment disclosed herein is a particulate oxide composition comprising cerium oxide and trivalent dopant selected from the group consisting of yttrium (Y), lanthanum (La), neodymium (Nd), praseodymium (Pr), and mixtures thereof, and optionally an additional metal oxide selected from the group consisting of aluminum (Al), titanium (Ti), zirconium (Zr), hafnium (Hf), and mixtures thereof, wherein the cerium oxide is present in an amount greater than the trivalent dopant, wherein the average trivalent dopant to Ce ratio at about 0 nm to about 3.5 nm from the surface of the particulate composition is greater than the trivalent dopant to Ce ratio at about 15 nm from the surface of the particulate oxide composition, and wherein the composition comprises about 2 wt % to about 30 wt % trivalent dopant. In one embodiment of this particulate oxide composition, the composition comprises cerium oxide in an amount of about 98 wt % to about 70 wt % based on the total weight of the particulate oxide composition.

It can be appreciated that the particulate oxide compositions containing trivalent doped $CeO_2$ as disclosed herein having the described depth profile can have any of the above described amounts of trivalent dopant, cerium oxide, and optional additional metal oxide.

In particular embodiments, the particulate oxide composition contains cerium oxide and trivalent dopant with only minor amounts to no (i.e., about zero) additional metal oxides and only 1% to no (i.e., zero or undetectable) amounts of impurities. When present and detectable, any impurities are generally present in an amount of about 100 ppm or less.

In certain embodiments, the particulate oxide compositions have an average trivalent dopant to Ce ratio at about 0 nm to about 3.5 nm from the surface of the particulate oxide composition that is about 10% to about 250% greater than the trivalent dopant to Ce ratio at about 15 nm from the surface of the particulate oxide composition. In other embodiments, the particulate oxide compositions have an average trivalent dopant to Ce ratio at about 0 nm to about 3.5 nm from the surface of the particulate oxide composition that is about 15% to about 250% greater than the trivalent dopant to Ce ratio at about 15 nm from the surface of the particulate oxide composition. As stated above, it is understood that 0 nm from the surface of the particulate oxide composition is the surface of the particulate oxide composition.

It can be appreciated that the particulate oxide compositions containing trivalent doped $CeO_2$ as disclosed herein having the above described depth profile also can have any of the above described amounts of trivalent dopant, cerium oxide, and optional additional metal oxide, and the below described additional properties.

Figure 5A:
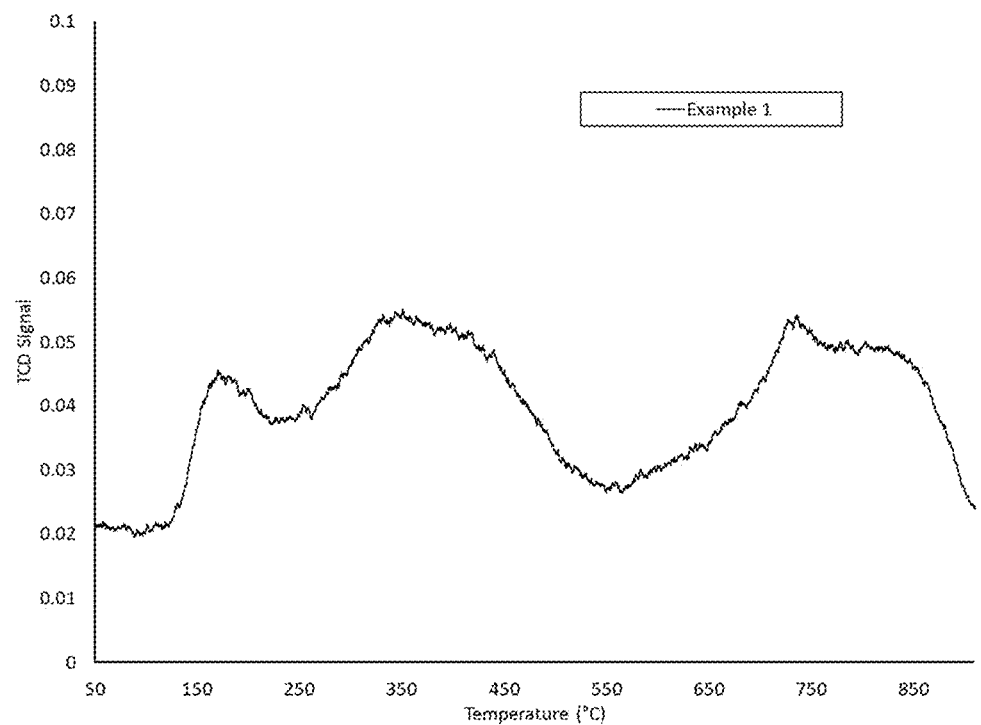
FIG. 5A is the temperature programed desorption of $CO_2$ for the composition of Example 1.
Figure 5B:
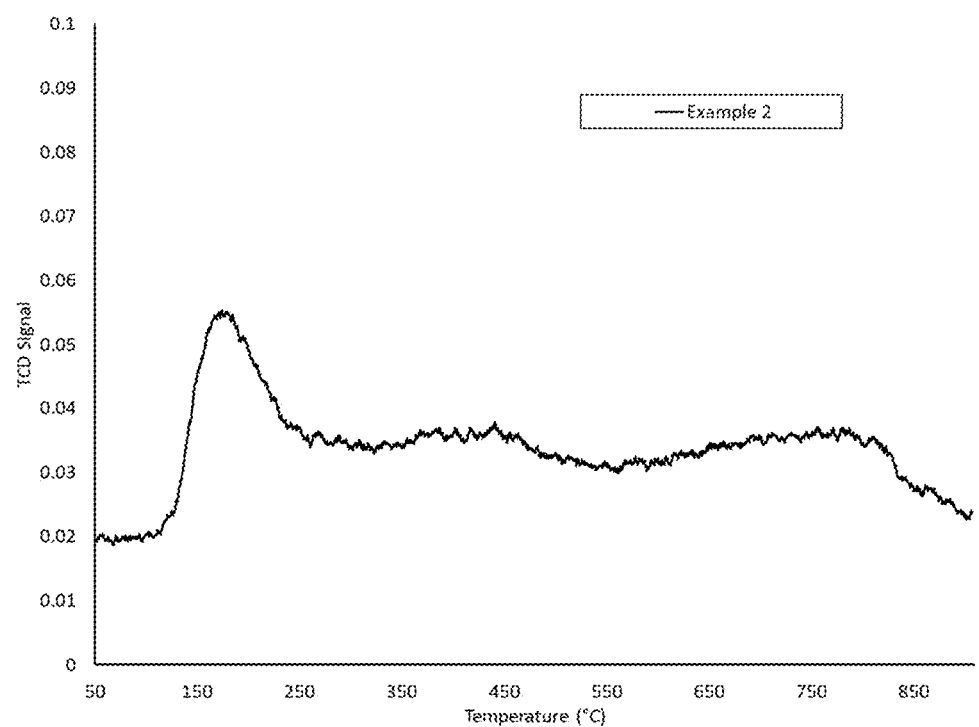
FIG. 5B is the temperature programed desorption of $CO_2$ for the composition of Example 2.
Figure 5C:
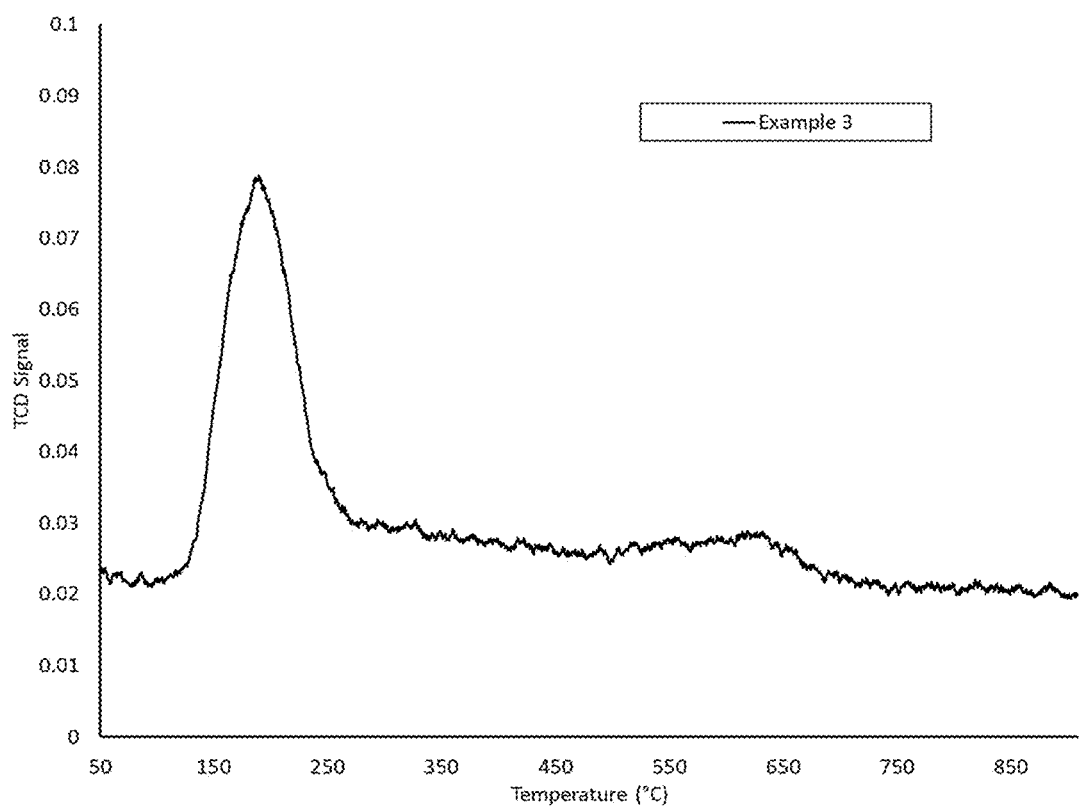
FIG. 5C is the temperature programed desorption of $CO_2$ for the composition of Example 3.

The novel particulate oxide compositions containing trivalent doped $CeO_2$ also can exhibit unique physical characteristics, including for example, exhibiting both physisorption and chemisorption of $CO_2$ (see FIGS. 5A, 5B, and 5C). Physisorption also is known as physical adsorption and is a weak association, such as through van der Waals. Chemisorption also is known as chemical adsorption. In chemisorption, adsorption takes place, and the adsorbed substance is bound by chemical bonds. This is a much stronger adsorption than physisorption. Exhibiting physisorption and chemisorption is a unique characteristic of the novel particulate compositions containing trivalent doped $CeO_2$ having the above described depth profile. Since the adsorbant is $CO_2$ (an acid), exhibiting chemisorption indicates the material is more basic and may provide improved activity for removing biological contaminants. This property of exhibiting physisorption and chemisorption may be combined with any of the above described depth profiles and any of the above described amounts of trivalent dopant, cerium oxide, and optional additional metal oxide, as well as the below described additional properties.

Figure 6:
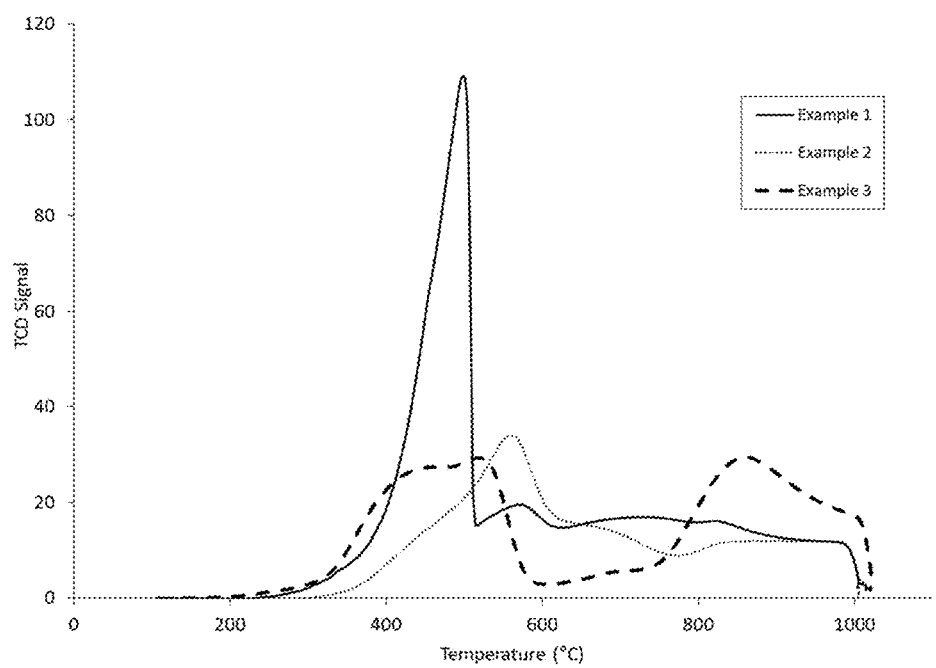
FIG. 6 is the temperature programed desorption of $H_2$ for the composition of Example 1, Example 2, and Example 3.

The novel particulate oxide compositions with the unique depth profile also can be more readily reduced than compositions made by prior art methods, and thus, these novel compositions are more oxidizing. FIG. 6 is a graph of the temperature program hydrogen reduction of material from Examples 1, 2, and 3. Example 1 has a large sharp peak at a lower temperature. This peak indicates that this novel particulate oxide composition is more easily reduced as compared to the compositions of Example 2 or 3. Thus, the novel particulate oxide compositions can be more oxidizing and thus more effective for removing/reducing biological contaminants. The graph for Example 2 has essentially the same shape as Example 1 but it is shifted to higher temperatures, which indicates more energy is needed for the material to react with hydrogen and would thus it would be less oxidizing than Example 1. The graph for Example 3, which is undoped cerium oxide, shows two peaks for hydrogen reduction that are broad and not very tall. This would indicate there are two types of reductions that could take place with this material and the higher temperature one is much more difficult to achieve. Without wishing to be bound by any theory, the unique depth profile for the novel particulate oxide compositions such that there is a higher ratio of trivalent dopant to Ce on and closer to the surface of the particulate matter could lead to this change in hydrogen reduction temperature and more oxidative properties. And these more oxidative properties of the novel particulate oxide compositions having the unique depth profile can provide improved activity for removing biological contaminants. This property also can be combined with any of the above described depth profiles, physical properties, and any of the above described amounts of trivalent dopant, cerium oxide, and optional additional metal oxide, as well as the below described additional properties.

Figure 7:
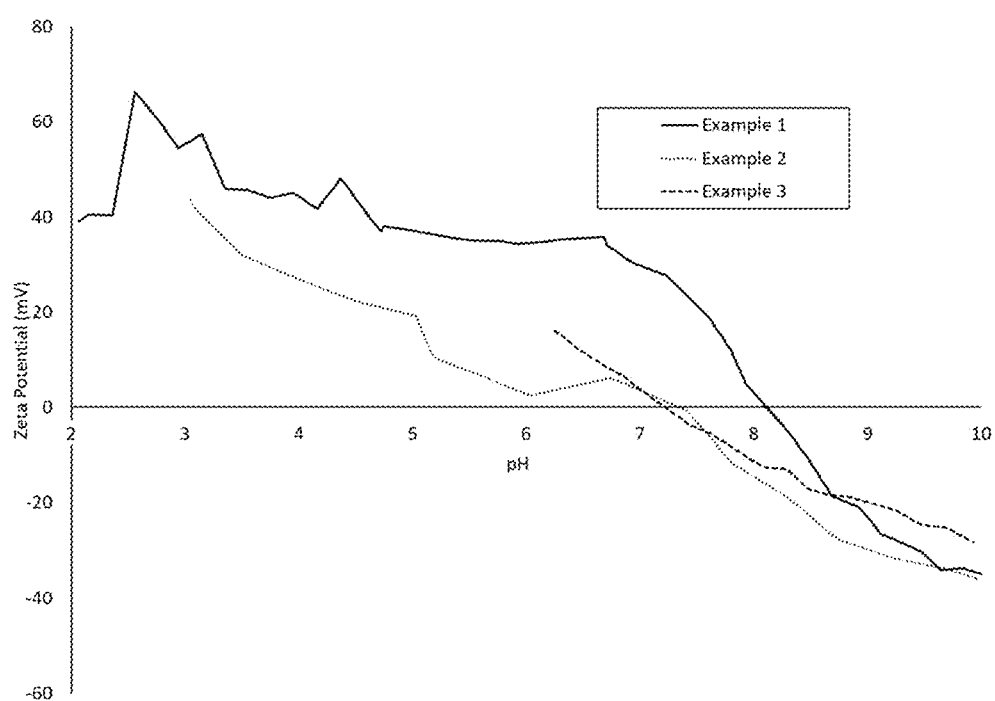
FIG. 7 is the zeta-potential vs pH graph for the composition of Example 1, Example 2, and Example 3.

The novel particulate oxide compositions containing trivalent doped $CeO_2$ and having the unique depth profile as disclosed herein can exhibit more basicity as indicated by its isoelectric point and zeta potential (see FIG. 7). In certain embodiments, the particulate oxide composition as described herein has an isoelectric point at a pH of about 8 to about 9. In additional embodiments, the particulate oxide composition as described herein has a zeta potential of about 20 to about 40 mV at a pH of about 7. Having a higher isoelectric point indicates the material is more basic and may provide improved activity for removing biological contaminants. This property also can be combined with any of the above described depth profiles, physical properties, and any of the above described amounts of trivalent dopant, cerium oxide, and optional additional metal oxide, as well as the below described additional properties.

The particulate oxide compositions containing trivalent doped $CeO_2$ as disclosed herein also can have a surface area that assists in providing the biological contaminant removal properties.

As described herein, the surface area is the apparent surface area of the compositions as determined by using a Micromeritics ASAP 2000 system and nitrogen at about 77 Kelvin. The procedure outlined in ASTM International test method D 3663-03 (Reapproved 2008) was used but with one significant exception. It is well known that a "BET Surface Area" determination is not possible for materials that contain microporosity. Recognizing that the surface area is an approximation, the values reported are labeled "apparent surface area" values rather than "BET surface area" values. In compliance with commonly accepted procedures, the determination of apparent surface area, the application of the BET equation was limited to the pressure range where the term na(l-P/Po) of the equation continuously increases with P/Po. The out gassing of the sample was done under nitrogen at about 300 degrees Celsius for about 2 hours.

The particulate oxide compositions containing trivalent doped $CeO_2$ as disclosed herein can have a surface area of about 70 $m^2/g$ to about 300 $m^2/g$. While not wanting to be bound by any theory, it is believed that the surface area can affect and improve the removal of the biological contaminant from a gaseous or an aqueous stream or by contact with a solid surface.

It can be appreciated that the particulate oxide compositions having this surface area can have the below-described average pore volume in combination with any one or more of the depth profile and the other above-described properties, as well as any of the above described amounts of trivalent dopant, cerium oxide, and optional additional metal oxide.

The particulate oxide compositions typically have an average (mean, median, and mode) pore volume (as determined by $N_2$ adsorption) of about 0.01 $cm^3/g$ to about 1.5 $cm^3/g$. While not wanting to be bound by any theory it is believed that the average pore volume can affect and improve the removal of the biological contaminant from an aqueous or gaseous stream.

It can be appreciated that the particulate oxide compositions can have the above-described average pore volumes in combination with any one or more of the above surface areas, depth profile, and the other above-described properties, as well as any of the above described amounts of trivalent dopant, cerium oxide, and optional additional metal oxide.

The particulate oxide compositions containing cerium oxide and one or more trivalent dopants as disclosed herein effectively remove biological contaminants. The trivalent doped cerium oxide particulate compositions are capable of removing approximately 90% or more of the biological contaminants. In certain embodiments, the trivalent doped cerium oxide particulate compositions are capable of removing approximately 99% or more of the biological contaminants.

The particulate oxide compositions can be slurried with a biological contaminant-containing aqueous stream and effectively remove the biological contaminants. In some embodiments, slurrying the particulate oxide compositions with a biological contaminant-containing aqueous stream removes at least about 90% of the biological contaminant. In other embodiments, the slurrying removes at least 95%, or more preferably 99% or 99%+ of the biological contaminant.

The particulate oxide compositions as described herein also can be incorporated into supported compositions and/or articles for removing biological contaminants as described infra.

Supported Compositions and Articles

Also disclosed herein are supported compositions comprising a support material and the trivalent doped $CeO_2$ particulate compositions as described herein. These supported compositions are for removing biological contaminants and comprise a support material and the trivalent doped cerium oxide particulate composition comprising cerium oxide doped with a trivalent dopant selected from the group consisting of yttrium (Y), lanthanum (La), neodymium (Nd), praseodymium (Pr), and mixtures thereof, and optionally an additional metal oxide selected from the group consisting of aluminum (Al), titanium (Ti), zirconium (Zr), hafnium (Hf), and mixtures thereof, as described herein.

As such, the supported compositions comprise a support material and the particulate oxide composition comprising cerium oxide, the one or more trivalent dopants, and optionally the additional metal oxides, other than the cerium oxide and trivalent dopant, and/or trace amounts of impurities. In certain embodiments, the particulate oxide composition contains about zero additional metal oxides. In certain embodiments the particulate oxide composition has the unique depth profile wherein the cerium oxide is present in amount greater than the trivalent dopant and wherein the average trivalent dopant to Ce ratio at about 0 nm to about 3.5 nm from the surface of the particulate oxide composition is greater than the trivalent dopant to Ce ratio at about 15 nm from the surface of the particulate composition. The particulate oxide compositions in the supported compositions include all of the embodiments for the particulate oxide composition as described supra.

The supported compositions for removing biological contaminants also comprise a support material. This support material comprises an organic polymer, cotton, glass fiber, or mixtures thereof.

The organic polymer can be a homopolymer of organic monomers or a co-polymer. The organic polymer also can be a silicone or polysiloxane (i.e., a polymer made up of siloxane (—R$_2$Si—O—SiR$_2$—, where R=organic group)). The organic polymer also can be a thermoset polymer, such as a thermoplastic elastomer. In certain embodiments, the organic polymer is selected from the group consisting of polyethylene, polycarbonate, polyvinyl chloride, nylon, polypropylene, polyester, polyurethane, polyamide, polyolefin, copolymers thereof, and mixtures thereof. In certain embodiments, the organic polymer is silicone.

In the supported compositions as disclosed herein, the particulate oxide composition is deposited on or within the support material.

In one embodiment of the supported composition, the particulate oxide composition comprises cerium oxide in an amount of about 99.9 wt % to about 20 wt % based on the total weight of the particulate oxide composition; trivalent dopant in an amount of about 0.1 wt % up to about 50 wt % based on the total weight of the particulate oxide composition; and additional metal oxide in an amount of about 70 wt % to about 0 wt % based on the total weight of the particulate oxide composition.

In another embodiment of this supported composition, the particulate oxide composition comprises about 0.1 wt % up to about 50 wt % trivalent dopant and about 99.9 wt % to about 50 wt % cerium oxide based on the total weight of the particulate oxide composition.

In yet another embodiment of this supported composition, the particulate oxide composition comprising cerium oxide in an amount of about 20 wt % to about 30 wt % based on the total weight of the particulate oxide composition; trivalent dopant in an amount of about 2 wt % to about 25 wt % based on the total weight of the particulate oxide composition; and additional metal oxide in an amount of about 45 wt % to about 78 wt % based on the total weight of the particulate oxide composition.

In a further embodiment of this supported composition, the particulate oxide composition comprises cerium oxide in an amount of about 45 wt % to about 78 wt % based on the total weight of the particulate oxide composition; trivalent dopant in an amount of about 2 wt % to about 25 wt % based on the total weight of the particulate oxide composition; and additional metal oxide in an amount of about 20 wt % to about 30 wt % based on the total weight of the particulate oxide composition.

In these supported compositions, it can be appreciated that the particulate oxide compositions within the supported composition can have any of the above described amounts of trivalent dopant, cerium oxide, and optional additional metal oxide.

These supported compositions can comprise a support material comprising an organic polymer, cotton, glass fiber, or mixtures thereof and the novel particulate oxide composition, as described supra, having the unique depth profile. As described, this particulate oxide composition is a mixed oxide composition (i.e., a mixture of oxides of the cerium, trivalent dopant, and optionally additional metal oxides) and has unique structural (i.e., physical) and electrochemical properties. In these supported compositions, the particulate oxide composition comprises cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant and wherein the average trivalent dopant to Ce ratio at about 0 nm to about 3.5 nm from the surface of the particulate oxide composition is greater than the trivalent dopant to Ce ratio at about 15 nm from the surface of the particulate composition. In these supported compositions, the particulate oxide composition (i.e., the novel trivalent doped cerium oxide) is deposited on or within the support material. This novel particulate oxide composition includes all of the embodiments as described supra, including all of the properties and any of the above described amounts of trivalent dopant, cerium oxide, and optional additional metal oxide.

In all embodiments, the supported compositions contain approximately 0.5 to approximately 80 weight % particulate oxide composition (i.e., trivalent doped cerium oxide) based on the total weight of the supported composition. In certain embodiments, the compositions contain approximately 0.5 to approximately 50 weight % particulate oxide composition based on the total weight of the supported composition. In other embodiments, the compositions contain approximately 0.5 to approximately 25 weight % particulate oxide composition based on the total weight of the supported composition. In yet other embodiments, the compositions contain approximately 0.5 to approximately 10 weight % particulate oxide composition based on the total weight of the supported composition. In additional embodiments, the compositions contain approximately 0.5 to approximately 5 weight % particulate oxide composition based on the total weight of the supported composition.

The supported composition containing the support material and the particulate oxide composition (i.e., trivalent doped cerium oxide) can be in a rigid or elastic form. The supported composition can form an article for removing biological contaminants, such as a filter or a plastic container. The article can be in a rigid or elastic form.

When the supported composition forms an article, the article contains about 50 to about 100 weight % of the supported composition containing the support material and the particulate oxide composition based on the total weight of the article. In certain embodiments, the article contains about 75 to about 95 weight % of the supported composition containing the support material and the particulate oxide composition based on the total weight of the article.

When the particulate oxide composition and support are formed into an elastic or rigid article, the article also may include binder, sand, gravel, glass wool, a metal or plastic container, and the like.

In some embodiments, the support material can be an organic polymer. In certain of these embodiments, the trivalent dopant is Pr, La, or a mixture thereof. When this composition using an organic polymer as the support material forms an article, the article can be a plastic article. In these embodiments, the organic polymer can be selected from the group consisting of polyethylene, polyvinyl chloride (PVC), nylon, polypropylene, polyester, polyurethane, polyamide, polyolefin, polycarbonate, copolymers thereof, and mixtures thereof. In specific embodiments, the organic polymer is polyethylene, polycarbonate, or mixtures thereof. When a plastic, the article can be in the form of a filter, bottle, container, or a plastic covering for a high touch service. The filter can be a fixed bed. The bottle or container may be for liquids. High touch surfaces include escalator or stair handrail covering, an elevator button covering, a door, a door handle or knob or covering therefore, coverings on public transportation, touch pads for electronic transactions, and the like.

In some embodiments, the support material can be cotton. In certain of these embodiments, the trivalent dopant is Pr, La, or a mixture thereof. When this supported composition using cotton as the support material forms an article, the article can be a filter or a fabric.

In some embodiments, the support material can be glass fiber. In certain of these embodiments, the trivalent dopant is Pr, La, or a mixture thereof. When this supported composition using glass fiber as the support material forms an article, the article can be a filter, bottle, container, or high touch surface. The filter can be a fixed bed. High touch surfaces include an elevator button covering, a door, coverings on public transportation, touch pads for electronic transactions, and the like.

In certain embodiments, the support material can be cotton and an organic polymer. In certain of these embodiments, the organic polymer can be selected from the group consisting of nylon, polyester, polyamide, and mixtures thereof. In certain of these embodiments, the trivalent dopant is Pr, La, or a mixture thereof. When this mixture as the support material forms an article, the article can be a filter or a fabric.

In certain embodiments, the support material can be glass fiber and an organic polymer. The organic polymer can be selected from the group consisting of polyethylene, polyvinyl chloride (PVC), nylon, polypropylene, polyester, polyurethane, polyamide, polyolefin, polycarbonate, copolymers thereof, and mixtures thereof. In certain of these embodiments, the organic polymer can be selected from the group consisting of polyethylene, polycarbonate, and mixtures thereof. In certain of these embodiments, the trivalent dopant is Pr, La, or a mixture thereof. When this mixture as the support material forms an article, the article can be a filter, bottle, container, or high touch surface. The filter can be a fixed bed. High touch surfaces include escalator or stair handrail covering, an elevator button covering, a door, a door handle or knob covering, coverings on public transportation, touch pads for electronic transactions, and the like.

In some embodiments, the support material can be polyethylene or polycarbonate. In certain of these embodiments, the trivalent dopant is Pr, La, or a mixture thereof. And when the supported composition forms an article, the article can be a plastic article and can be in the form of a filter, bottle, container, or plastic covering for a high touch surface. The filter can be a fixed bed.

In certain embodiments, the support material can be silicone In certain of these embodiments, the trivalent dopant is Pr, La, or a mixture thereof.

In a specific embodiment, the article is a plastic article. The plastic article can be in the form of a filter, bottle, container, or plastic covering for a high touch surface. The plastic article comprises a supported composition for removing biological contaminants comprising (i) an organic polymer selected from the group consisting of polyethylene, polyvinyl chloride, nylon, polypropylene, polyester, polyurethane, polyamide, polyolefin, polycarbonate, copolymers thereof, and mixtures thereof. The plastic article further comprises (ii) particulate oxide composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof. In certain of these embodiments, the trivalent dopant is Pr, La, or a mixture thereof. And in certain of these embodiments of the plastic article, the organic polymer can be selected from the group consisting of polyethylene, polycarbonate, and mixtures thereof.

In particular embodiments of the plastic article, it comprises (ii) particulate oxide composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant and wherein the average trivalent dopant to Ce ratio at about 0 nm to about 3.5 nm from the surface of the particulate oxide composition is greater than the trivalent dopant to Ce ratio at about 15 nm from the surface of the particulate composition. In certain of these embodiments of the plastic article, the organic polymer can be selected from the group consisting of polyethylene, polycarbonate, and mixtures thereof.

In all embodiments of the plastic article, the particulate oxide composition is deposited on or within the organic polymer. In certain embodiments, the plastic article comprises about 50 to about 100 weight percent of the supported composition for removing biological contaminants based on the total weight of the plastic article.

In certain embodiments of the plastic article, it comprises a particulate oxide composition comprising about 0.1 wt % up to about 50 wt % trivalent dopant and about 99.9 wt % to about 50 wt % cerium oxide based on the total weight of the particulate oxide composition. This specific particulate oxide composition includes all of the embodiments for the particulate oxide composition as described supra.

The novel trivalent doped cerium oxide particulate compositions having the unique depth profile, the supported compositions, and the articles as disclosed herein are capable of removing approximately 90% or more of the biological contaminants. In certain embodiments, the novel trivalent doped cerium oxide particulate compositions having the unique depth profile, supported compositions, and articles as disclosed herein are capable of removing approximately 99% or more of the biological contaminants.

The biological contaminants to be removed by the articles, supported compositions, particulate oxide compositions, and methods disclosed herein include viruses, bacteria, fungi, (e.g., mold or fungus), protozoa (e.g., amoebae), algae, yeast, and the like, and mixtures thereof. In certain embodiments, the biological contaminants to be removed by the articles, compositions, and methods disclosed herein are selected from the group consisting of a bacteria, viruses, fungi (e.g., mold), protozoa (e.g., amoebae), and mixtures thereof. In specific embodiments, the biological contaminants to be removed by the articles, compositions, and methods disclosed herein are bacteria, viruses, amoebae, and mixtures thereof. In other embodiments, the biological contaminants are bacteria, viruses, and mixtures thereof.

In certain embodiments the biological contaminants to be removed include those of concern in aqueous streams, such as wastewater, and those of concern which are airborne.

The bacteria include gram positive and gram negative bacteria. The bacteria include those commonly found in water, including fecal coliform bacteria. The bacteria include, for example, *Streptococcus, Staphylococcus, Escherichia coli*, Methicillin-resistant *Staphylococcus aureus* (MRSA), *Legionella pneumophila, Campylobacter jejuni, Salmonella, Mycobacterium tuberculosis, Corynebacterium diphtheriae, Listeria monocytogenes, Bordetella pertussis*, and the like. The viruses include, for example, rhinovirus, coronaviruses, vaccinia, poliovirus, varicella zoster virus, paramyxovirus, influenza virus, morbillivirus, hepatitis A virus (HAV), adenovirus (HAdV), rotavirus (RoV), sapovirus, respiratory syncytial virus (RSV), paramyxovirus, varicella-zoster virus (VZV), variola virus (including small pox and monkey pox), and other enteric viruses, such as noroviruses (NoV), coxsackievirus, echovirus, reovirus and astrovirus, and the like. Other microbial contaminants include protozoa (such as *Cryptosporidium*) and specifically amoebae (such as *Naegleria fowleri*). Further microbial contaminants, which are fungi, include *Trichophyton mentagrophytes* and *Aspergillus*.

The articles, compositions, and methods disclosed herein, including the cerium oxide doped with trivalent rare earths, reduce the concentration or amount of these biological contaminants.

Method of Making the Novel Trivalent Doped Cerium Oxide Particulate Oxide Composition There are known methods for making trivalent doped cerium oxide compositions (see for example U.S. patent application Ser. No. 17/870,068, the contents of which are hereby incorporated by reference in their entirety). However, the methods as disclosed herein are novel and provide the novel particulate oxide composition comprising the cerium oxide doped with trivalent rare earths having the unique depth profile and other unique properties as described supra. The methods make the particulate oxide compositions including all of the embodiments as described supra. These novel particulate oxide compositions are capable of reducing the concentration of biological contaminants and are made by the process as disclosed herein.

The particulate oxide composition comprising cerium oxide doped with trivalent rare earths is made by intimately mixing trivalent rare earth carbonates, oxides, or mixtures thereof and cerium (IV) oxide with an aqueous solution of soluble salts of trivalent rare earth. If additional metal oxides are desired in the particulate oxide composition, they are included within the cerium (IV) oxide, such as by using a cerium aluminum oxide or a cerium zirconium oxide and the like. The soluble salts of the trivalent rare earth can be any salts that are soluble in aqueous solutions, including for example nitrates and chlorides. The concentration of the aqueous salt solutions utilized can be about 0.02 to about 3 mol/L.

In certain embodiments, trivalent rare earth oxides and cerium oxides are intimately mixed with an aqueous solution of trivalent rare earth nitrates.

In these methods, the trivalent rare earths are the trivalent dopants within the particulate composition and can be selected from the group consisting of yttrium (Y), lanthanum (La), neodymium (Nd), praseodymium (Pr), and mixtures thereof. The amounts of soluble salts of trivalent rare earth and trivalent rare earth carbonates, oxides, or mixtures thereof and cerium (IV) oxide are chosen to achieve the desired weight percentage of trivalent dopant and cerium oxide in the particulate oxide composition.

The resulting solid is thermally treated to obtain the trivalent doped cerium oxide particulate composition. The thermal treatment can be at a temperature of about 200° C. to about 1000° C. and for a time of about 10 min to about 5 hours. This final thermal treatment dries the resulting solid. In certain embodiment the temperature is approximately 550° C. to approximately 800° C.

The trivalent doped cerium oxide particulate compositions then can be used to prepare the supported compositions disclosed herein for removing biological contaminants comprising a support material and the trivalent doped cerium oxide particulate composition, wherein the trivalent doped cerium oxide particulate composition is deposited on or within the support material. The trivalent doped cerium oxide particulate compositions also can be used to prepare the articles as disclosed herein comprising the supported compositions. The trivalent doped cerium oxide particulate compositions further can be used in the methods described herein for removing biological contaminants.

Preparing Supported Compositions and Articles

The supported compositions as disclosed herein contain the particulate oxide composition and a support material as described herein. In particular embodiments, the supported compositions contain the novel particulate oxide composition comprising the cerium oxide and trivalent dopant and having the unique depth profile as described supra. The particulate oxide composition optionally may comprise the additional metal oxides other than the cerium oxide and trivalent dopant. This particulate oxide composition is prepared as described above. The particulate oxide composition, supported compositions, and articles include all of the embodiments described herein. In the supported composition, the support material is selected from an organic polymer, cotton, glass fiber, or mixtures thereof.

The supported composition of the particulate oxide composition of the cerium oxide, trivalent dopant, and optional additional metal oxide and support material independently may be used for treating gaseous or aqueous mixtures. Or the supported composition of the particulate oxide composition of the cerium oxide, trivalent dopant, optional additional metal oxide, and support material may be incorporated into an article specifically designed for treating gaseous or aqueous mixtures, such as a filter or a plastic container. The filter may be a fixed bed. The filter may be used for a gaseous or aqueous mixture or stream and thus to filter the gaseous or aqueous mixture or stream.

In supported compositions and in articles containing supported compositions, the particulate oxide composition containing the trivalent doped cerium oxide is deposited onto a support material or within the support material to provide the supported composition for removing biological contaminants.

The particulate composition of the cerium oxide, trivalent dopant, and optional additional metal oxide can be deposited on one or more external and/or internal surfaces of the support material. It can be appreciated that persons of ordinary skill in the art generally refer to the internal surfaces of the support material as pores. The trivalent doped cerium oxide particulate composition as described herein can be supported on the support material with or without a binder. In some embodiments, the trivalent doped cerium oxide particulate composition can be applied to the support material using any conventional techniques, such as slurry deposition.

Processes of preparing the supported compositions disclosed herein are not limited by any particular steps or methods, and generally can be any that result in the incorporation of the trivalent doped cerium oxide particulate composition into a support material or deposited onto a support material. Processes to incorporate the trivalent doped cerium oxide particulate composition into a support material include mixing the trivalent doped cerium oxide particulate composition into the support material production. As an example, the trivalent doped cerium oxide particulate composition can be added to molten polypropylene in the molding process. As another example, the trivalent doped cerium oxide particulate composition can be added to a mixture of polyvinyl chloride resin, a plasticizer, and a stabilizer and passed through a hot mixer followed by an extruder.

Processes to deposit the trivalent doped cerium oxide particulate composition onto a support material include mixing the trivalent doped cerium oxide particulate composition with an organic binder either as a liquid or in an aqueous solution. The mixture of trivalent doped cerium oxide particulate composition and organic binder is then bound to the support material by immersion of the support material or by coating the support material with the mixture by spreading or air brushing. The organic binder also can be used in slurry deposition techniques.

In certain embodiments, the organic binder is selected from the group consisting of citric acid, polyurethane diol, polyvinyl alcohol, polyvinylpyrollidone, linseed oil, and mixtures thereof. Once the trivalent doped cerium oxide particulate composition is bound to the support material, the support as coated optionally may be rinsed with water prior to drying to remove residual not bound to the support. The coated support can then be optionally dried at temperatures above about 20° C. and below about 300° C. for about 1-12 hours or until sufficiently dry. In certain embodiments, the coated support can then be optionally dried at temperatures above about 20° C. and below about 120° C.

In the case of support materials that can melt, such as glass or plastics, the support can be heated to the point where the surface just begins to soften, then the trivalent doped cerium oxide particulate composition can be placed on the surface such that it begins to mix with the semi-molten material. Upon cooling and resolidifying the trivalent doped cerium oxide particulate composition is incorporated into the surface of the support material. The temperature utilized would depend on the support material utilized. One of skill in the art readily would be able to determine the appropriate temperature for the support material being utilized. For example, this temperature for quartz glass would be over 1000° C.; borosilicate glass would be about 500-600° C.; and PVC would be about 200-300° C.

These solid supports can be utilized to form articles including filters and plastic articles.

The trivalent doped cerium oxide particulate compositions also may be incorporated into an article for a high touch surface and this high touch surface may come into contact with biological contaminants by direct touch contact. As such, articles for high touch surfaces also may be utilized in reducing bacteria and/or viruses deposited through contact and not necessarily just in treating fluids. These articles may be containers for liquids, elevator buttons, hand railing covers for escalators or stairs, a door, door handle, door knob, coverings on public transportation, touch pads for electronic transactions, fabrics, and the like.

The supported compositions containing the trivalent doped cerium oxide particulate composition and support material can be formed into an elastic or rigid article, such as a filter, a fixed bed filtration system, a bottle or container, a high touch surface, and the like. In specific embodiments the article is a plastic article. In other embodiments, the article is a filter. These articles may contain any additional necessary components that such articles ordinarily contain, as well recognized by those of skill in the art. Techniques for forming these articles are well known to those of skill in the art.

Methods for Using the Trivalent Doped Cerium Oxide Particulate Compositions

The present application relates to methods for removing biological contaminants using any of the above disclosed compositions containing trivalent doped cerium oxide. The methods can utilize the particulate oxide compositions of the cerium oxide, trivalent dopant, and optional additional metal oxide per se, or the methods can utilize the particulate oxide compositions as part of a supported composition or an article. The methods can treat a fluid, including air and aqueous and gaseous streams.

Without wishing to be bound by any theory, the unique depth profile for the novel particulate oxide compositions such that there is a higher ratio of trivalent dopant to cerium on and closer to the surface of the particulate composition may provide improved activity for removing biological contaminants.

In some embodiments, supported compositions comprising the particulate oxide composition, comprising cerium oxide, trivalent dopant, and optional additional metal oxide, and support material may be used independently in methods for removing biological contaminants, or the supported compositions of the particulate oxide composition and support material may be incorporated into an article specifically designed for treating gaseous or aqueous mixtures, such as a filter or a plastic container.

As described herein, the particulate oxide compositions comprise cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof, wherein the cerium oxide is present in an amount greater than the trivalent dopant. In certain embodiments, the average trivalent dopant to Ce ratio at about 0 nm to about 3.5 nm from the surface of the particulate oxide composition is greater than the trivalent dopant to Ce ratio at about 15 nm from the surface of the particulate composition. It can be appreciated that in these methods, the particulate oxide compositions can have any of the above described amounts of trivalent dopant, cerium oxide, and optional additional metal oxide, and any of the above described properties.

In certain embodiments of the methods, the present application relates to methods for removing and ensuring a target concentration or less of biological contaminants using the disclosed compositions containing trivalent doped cerium oxide. These biological contaminants include bacteria, viruses, protozoa (e.g., amoebae), fungi, algae, yeast, and the like. These compositions include the particulate oxide compositions per se, supported compositions containing the particulate oxide compositions, and articles containing supported compositions containing the particulate oxide compositions. In certain embodiments, these particulate oxide compositions are those with the unique depth profile. It can be appreciated that the particulate oxide compositions can have any of the above described amounts of trivalent dopant, cerium oxide, and optional additional metal oxide, and any of the above described properties. These methods may treat fluids (e.g., an aqueous or gaseous stream) or surfaces of solid objects through touch/direct contact. As such, the methods disclosed herein include methods for treating fluids (e.g., aqueous and/or gaseous streams).

In certain embodiments of the methods, an aqueous or gaseous stream is contacted with the particulate oxide compositions containing trivalent doped cerium oxide. The particulate oxide compositions include all of the embodiments described supra, including any of the above described amounts of trivalent dopant, cerium oxide, and optional additional metal oxide, and any of the above described properties.

In other embodiments of the methods, an aqueous or gaseous stream is contacted with the supported compositions containing the particulate oxide compositions as described herein. In yet other embodiments of the methods, a potentially contaminated surface is contacted with the supported compositions or articles containing the particulate oxide compositions as described herein. These potentially contaminated surfaces include, for example, skin (e.g., a hand, finger, palm, etc.) and the contact is through touching the supported compositions or articles containing the particulate oxide compositions as described herein. In the methods as disclosed, the biological contaminant to be removed may be contained within an aqueous or gaseous stream or may be on the surface of the physical object.

While not wanting to be bound by any theory, it is believed that the contacting of the particulate oxide compositions as described herein with the biological contaminant leads to the biological contaminant one or more of sorbing and/or reacting with the trivalent doped cerium oxide or deactivating when contacted with the trivalent doped cerium oxide. The sorbing, reacting, and/or deactivating of the biological contaminant with the trivalent doped cerium oxide removes the biological contaminant from the biological contaminant-containing fluid (air or aqueous stream) or the solid surface. Without wishing to be bound by any theory, the unique depth profile for the novel particulate oxide compositions such that there is a higher ratio of trivalent dopant to cerium on and closer to the surface may provide improved activity for removing biological contaminants.

The biological contaminant may be removed to a target level or to below a target level. In some embodiments the biological contaminant may be removed to a level at which it is undetectable. The target level may be a specified amount or the limit of detection. As part of the methods described herein, the biological contaminant to be removed may be identified and the target amount or level for the contaminant may be set. For certain of the biological contaminants contemplated herein, the target amount or level would be any detectable amount. The methods optionally may additionally comprise monitoring the treated stream for the contaminant.

The methods disclosed herein may be used to treat air or water or may be used to treat contaminants through contact by touch. When used to treat contaminants by contact through touch, the disclosed compositions are incorporated into a high touch surface.

Using the disclosed particulate oxide compositions, containing cerium oxide, trivalent dopant, and optional additional metal oxides, to treat biological contaminated air and/or water allows for the efficient operation of air and/or water treatment methods and provides a treated stream with reduced concentrations of biological contaminant. As disclosed herein, the particulate oxide compositions may be incorporated into a supported composition and those supported composition may be incorporated into an article specifically designed for treating gaseous or aqueous mixtures, such as a filter, a fixed bed filtration system, or in a plastic for a container. In methods of treating aqueous streams, the particulate oxide compositions also may be used per se and contacted through slurrying. In these methods involving slurrying, the method may further comprise filtering the fluid/liquid.

In any of these methods, the particulate oxide compositions can have any of the above described amounts of trivalent dopant, cerium oxide, and optional additional metal oxide, and any of the above described properties, including the unique depth profile.

Although the methods of the disclosure are envisioned for removing biological (e.g., bacterial, viral, amoebae, etc.) contaminants from air and/or drinking water and groundwater, it will be understood that the process can be used to treat any gaseous or aqueous liquid feed that contains undesirable amounts of biological contaminants. The methods also are envisioned for removing biological contaminants through direct contact of a contaminated surface with an article containing the particulate oxide compositions as disclosed herein.

In certain embodiments, these methods comprise (i) providing a particulate oxide composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof, wherein the cerium oxide is present in an amount greater than the trivalent dopant and wherein the average trivalent dopant to Ce ratio at about 0 nm to about 3.5 nm from the surface of the particulate composition is greater than the trivalent dopant to Ce ratio at about 15 nm from the surface of the particulate composition; (ii) contacting the composition with a biological contaminant wherein the biological contaminant is selected from the group consisting of bacteria, viruses, fungi, protozoa, and mixtures thereof; and (iii) removing biological contaminant through contact with the composition. The biological contaminant can be contained in an aqueous or liquid stream or on the surface of an object that is physically contacted with the composition containing the trivalent doped cerium oxide. These methods remove at least about 90% of the biological contaminant through contact with the composition.

In certain embodiments, the particulate oxide composition may be contained within a supported composition and in certain of these embodiments, the supported composition may be incorporated into an article. These methods may further comprise monitoring for the biological contaminant after contacting. The monitoring may be done by sampling or may be continuous.

The particulate oxide compositions as used in these methods include all of the embodiments as described supra. The novel particulate oxide compositions with the unique depth profile are particularly capable of reducing the concentration of biological contaminants.

In certain embodiments, these methods comprise (i) providing a supported composition comprising a support material comprising an organic polymer, cotton, glass fiber, or mixtures thereof and a particulate oxide composition comprising cerium oxide, trivalent dopant selected from the group consisting of yttrium (Y), lanthanum (La), neodymium (Nd), praseodymium (Pr), and mixtures thereof, and optionally an additional metal oxide selected from the group consisting of aluminum (Al), titanium (Ti), zirconium (Zr), hafnium (Hf), and mixtures thereof, wherein the cerium oxide is present in an amount greater than the trivalent dopant; (ii) contacting the supported composition with a biological contaminant wherein the biological contaminant is selected from the group consisting of bacteria, viruses, fungi, protozoa, and mixtures thereof; and (iii) removing the biological contaminant through contact with the composition. In certain of these embodiments, the particulate oxide composition has an average trivalent dopant to Ce ratio at about 0 nm to about 3.5 nm from the surface of the particulate composition that is greater than the trivalent dopant to Ce ratio at about 15 nm from the surface of the particulate composition. In certain of these embodiments, the particulate oxide composition comprises cerium oxide in an amount of about 99.9 wt % to about 20 wt % based on the total weight of the particulate oxide composition; trivalent dopant in an amount of about 0.1 wt % up to about 50 wt % based on the total weight of the particulate oxide composition; and additional metal oxide in an amount of about 70 wt % to about 0 wt % based on the total weight of the particulate oxide composition. The biological contaminant can be contained in an aqueous or liquid stream or on the surface of an object that is physically contacted with the composition containing the trivalent doped cerium oxide. These methods may further comprise monitoring for the biological contaminant after contacting. The monitoring may be done by sampling or may be continuous. The particulate oxide compositions as used in these methods including all of the embodiments as described supra. The novel particulate oxide compositions having the unique depth profile are particularly capable of reducing the concentration of biological contaminants.

In specific embodiments, these methods comprise (i) providing a supported composition comprising a support material comprising an organic polymer, cotton, glass fiber, or mixtures thereof, and the particulate oxide composition consisting essentially of cerium oxide and a trivalent dopant selected from the group consisting of yttrium (Y), lanthanum (La), neodymium (Nd), praseodymium (Pr), and mixtures thereof, wherein the cerium oxide is present in an amount greater than the trivalent dopant; (ii) contacting the composition with a biological contaminant wherein the biological contaminant is selected from the group consisting of bacteria, viruses, fungi (e.g., mold), protozoa (e.g., amoebae), and mixtures thereof; and (iii) removing biological contaminant through contact with the composition. In this embodiment, the particulate oxide composition can have an average trivalent dopant to Ce ratio at about 0 nm to about 3.5 nm from the surface of the particulate composition that is greater than the trivalent dopant to Ce ratio at about 15 nm from the surface of the particulate composition and the particulate oxide composition contains cerium oxide in an amount of about 99.9 wt % to about 50 wt % based on the total weight of the particulate oxide composition; and trivalent dopant in an amount of about 0.1 wt % up to about 50 wt % based on the total weight of the particulate oxide composition. The biological contaminant can be contained in an aqueous or liquid stream or on the surface of an object that is physically contacted with the composition containing the trivalent doped cerium oxide. These methods may further comprise monitoring for the biological contaminant after contacting. The monitoring may be done by sampling or may be continuous.

The particulate oxide composition of the methods as described herein comprises (or in certain embodiments consists essentially of) cerium oxide and trivalent dopant selected from the group consisting of yttrium (Y), lanthanum (La), neodymium (Nd), praseodymium (Pr), and mixtures thereof, wherein the cerium oxide is present in an amount great than the trivalent dopant. In embodiments, the average trivalent dopant to Ce ratio at about 0 nm to about 3.5 nm from the surface of the particulate composition is greater than the trivalent dopant to Ce ratio at about 15 nm from the surface of the particulate composition. The particulate oxide compositions as used in these methods include all of the embodiments as described supra, including any of the above described amounts of trivalent dopant, cerium oxide, and optional additional metal oxide, and any of the above described properties. The novel particulate compositions having the unique depth profile are particularly capable of reducing the concentration of biological contaminants.

The contacting of the particulate oxide composition with the biological contaminant leads to removal of a measurable amount of the biological contaminant. In some embodiments, the contacting removes at least about 90% of the biological contaminant. In other embodiments, the contacting removes at least 95%, or more preferably 99% or 99%+ of the biological contaminant. Without wishing to be bound by any theory, the unique depth profile for the novel particulate oxide compositions such that there is a higher ratio of trivalent dopant to cerium on and closer to the surface could provide improved activity for removing biological contaminants.

Contacting of the particulate oxide composition with biological contaminant effectively reduces the amount of biological contaminant, and in certain embodiments, it effectively reduces the amount of biological contaminant in a gaseous or aqueous stream. The removal also can be expressed as a percent reduction in concentration of the biological contaminant. In some embodiments, the contacting of the particulate oxide composition with the biological contaminant can reduce its concentration by more than about 75%. More typically, the contacting of the trivalent doped cerium oxide particulate composition with the biological contaminant can reduce its concentration by more than about 80%, more typically more than about 85%, more typically more than about 90%, more typically more than about 95%, more typically more than about 97.5%, more typically more than about 99%, and even more typically more than about 99.5%.

In specific embodiments, these methods may be for removing biological contaminants from fluid or for treating fluid. In these embodiments, the fluid may be a gaseous or aqueous stream. In these embodiments, the methods comprise (i) providing a supported composition comprising a support material comprising an organic polymer, cotton, glass fiber, or mixtures thereof and a particulate oxide composition comprising: cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant; (ii) contacting a biological contaminant containing gaseous or aqueous stream with the composition, wherein the biological contaminant is selected from the group consisting of bacteria, viruses, fungi (e.g., mold), protozoa (e.g., amoebae), and mixtures thereof; and (iii) removing biological contaminant from the gaseous or aqueous stream through contact with the composition. In certain embodiments, the average trivalent dopant to Ce ratio at about 0 nm to about 3.5 nm from the surface of the particulate oxide composition is greater than the trivalent dopant to Ce ratio at about 15 nm from the surface of the particulate composition. The biological contaminant can be removed in an amount of 90% or more. These methods may further comprise monitoring for the biological contaminant after contacting. The monitoring may be done by sampling or may be continuous.

In particular of these embodiments for removing biological contaminants from fluid or for treating fluid, the particulate oxide composition comprises cerium oxide in an amount of about 99.9 wt % to about 50 wt % based on the total weight of the particulate oxide composition; and trivalent dopant in an amount of about 0.1 wt % up to about 50 wt % based on the total weight of the particulate oxide composition. The particulate oxide compositions as used in these methods including all of the embodiments as described supra. The novel particulate oxide compositions are capable of reducing the concentration of biological contaminants.

In these methods of treating a gaseous or aqueous stream, the method may further comprise a step of setting a target concentration of biological contaminant. In these methods a biological contaminant of interest is identified and then a target concentration for that biological contaminant is set. The methods additionally may comprise a step of monitoring the biological contaminant in the treated stream. The monitoring may be done by sampling or may be continuous.

In certain embodiments, the methods comprise the steps of (i) providing a composition comprising a support material comprising an organic polymer, cotton, glass fiber, or mixtures thereof and particulate oxide composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant; (ii) setting a target concentration of a biological contaminant; (iii) contacting a gaseous or aqueous stream with the composition, and removing biological contaminant through contact with the composition to provide a treated stream; and (iv) monitoring the treated stream for the biological contaminant, wherein the biological contaminant is selected from the group consisting of bacteria, viruses, fungi (e.g., mold), protozoa (e.g., amoebae), and mixtures thereof. In certain embodiments, the particulate oxide composition has an average trivalent dopant to Ce ratio at about 0 nm to about 3.5 nm from the surface of the particulate composition that is greater than the trivalent dopant to Ce ratio at about 15 nm from the surface of the particulate composition. The particulate oxide compositions as used in these methods including all of the embodiments as described supra. These novel particulate oxide compositions having the unique depth profile are particularly capable of reducing the concentration of biological contaminants. The target concentration can be set at a certain amount of contaminant (e.g., virus, bacteria, protozoa/amoebae, or fungi) or can be set at the limit of detection. Monitoring of the biological contaminant can be performed through techniques well known to those of skill in the art. The monitoring may be done by sampling or may be continuous. One of skill in the art understands real-time and continuous monitoring techniques for microbial contaminants, including viruses, bacteria, protozoa/amoebae, fungi, and the like. These techniques include optical techniques and cell counters.

In specific embodiments of treating an aqueous stream, the methods comprise (i) providing a particulate composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant and wherein the average trivalent dopant to Ce ratio at about 0 nm to about 3.5 nm from the surface of the particulate oxide composition is greater than the trivalent dopant to Ce ratio at about 15 nm from the surface of the particulate composition; (ii) contacting the aqueous stream with the composition and removing biological contaminant through contact with the composition to provide a treated aqueous stream, wherein the biological contaminant is selected from the group consisting of bacteria, viruses, fungi (e.g., mold), protozoa (e.g., amoebae), and mixtures thereof. These methods may further comprise monitoring for the biological contaminant after contacting. The monitoring may be done by sampling or may be continuous. In specific embodiments the methods may further comprise setting a target concentration of a biological contaminant and monitoring the treated aqueous stream for the biological contaminant. The target concentration may be a specified amount or the limit of detection. In these methods, the particulate oxide composition may be contained within a supported composition or within a supported composition within an article or may be contacted by slurrying the particulate oxide composition per se with the aqueous stream. In methods involving slurrying, the method may further comprise filtering the fluid/liquid. The particulate oxide compositions as used in these methods including all of the embodiments as described supra.

In specific embodiments of treating an aqueous stream, the methods comprise (i) providing a supported composition comprising a support material comprising an organic polymer, cotton, glass fiber, or mixtures thereof and a particulate composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant; (ii) contacting the aqueous stream with the composition and removing biological contaminant through contact with the composition to provide a treated aqueous stream, wherein the biological contaminant is selected from the group consisting of bacteria, viruses, fungi (e.g., mold), protozoa (e.g., amoebae), and mixtures thereof. The particulate composition can have an average trivalent dopant to Ce ratio at about 0 nm to about 3.5 nm from the surface of the particulate oxide composition is greater than the trivalent dopant to Ce ratio at about 15 nm from the surface of the particulate composition. The particulate oxide compositions as used in these methods including all of the embodiments as described supra. These methods may further comprise monitoring for the biological contaminant after contacting. The monitoring may be done by sampling or may be continuous. In specific embodiments the methods may further comprise setting a target concentration of a biological contaminant and monitoring the treated aqueous stream for the biological contaminant. The target concentration may be a specified amount or the limit of detection.

In specific embodiments of treating a gaseous stream, the methods comprise the methods comprise (i) providing a supported composition comprising a support material comprising an organic polymer, cotton, glass fiber, or mixtures thereof and a particulate composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant; (ii) contacting the gaseous stream with the composition and removing biological contaminant through contact with the composition to provide a treated gaseous stream, wherein the biological contaminant is selected from the group consisting of bacteria, viruses, fungi (e.g., mold), protozoa (e.g., amoebae), and mixtures thereof. The particulate composition can have an average trivalent dopant to Ce ratio at about 0 nm to about 3.5 nm from the surface of the particulate oxide composition is greater than the trivalent dopant to Ce ratio at about 15 nm from the surface of the particulate composition. The particulate oxide compositions as used in these methods include all of the embodiments as described supra. These methods may further comprise monitoring for the biological contaminant after contacting. The monitoring may be done by sampling or may be continuous. In specific embodiments the methods may further comprise setting a target concentration of a biological contaminant and monitoring the treated gaseous stream for the biological contaminant. The target concentration may be a specified amount or the limit of detection.

When the biological contaminant is bacteria or fungi/mold, the removal can be expressed as a % reduction that is determined by using Colony Forming Units (CFU). In these embodiments, the concentration of bacteria contaminant after contacting with the particulate oxide composition or a supported composition or article comprising the particulate oxide composition can be about 45 colony forming units CFU/ml to $5 \times 10^5$ CFU/ml.

When the biological contaminant are bacteria and/or viruses, the removal can be expressed as a % reduction that is determined by using Most Probable Number (MPN) technique. Most Probable Number (MPN) is used to estimate the concentration of viable microorganisms in a sample by means of replicating liquid broth growth in ten-fold dilutions.

A target concentration for biological contaminant also can be set as a percentage reduction of the contaminant from prior to the method and then after contact in the method. In certain embodiments, this percent reduction can be about 75% to about 100% less. In other embodiments, this percent reduction can be about 80% to about 99.9%.

A target concentration for biological contaminant can be set at a limit of detection for that contaminant. As described above, in embodiments including setting a target concentration for biological contaminant, the methods may further comprise one or more of the following additional steps: identifying the biological contaminant of interest; setting the target concentration; and monitoring for the biological contaminant after the contacting step to determine or verify that the biological contaminant is below the target concentration. Depending on the biological contaminant, the target concentration can be any detectable amount of that contaminant and the methods as disclosed herein are effective in treating the aqueous or gaseous stream as long as no amount of that contaminant is detected in the treated stream.

In specific of these embodiments, the stream to be treated can be an aqueous stream and the targeted contaminant can be bacteria, virus, or protozoa (e.g., amoebae). For example, the stream to be treated is an aqueous or gaseous stream and the targeted contaminant can be *E. coli*, poliovirus, coronavirus, *Naegleria fowleri*, paramyxovirus, *Mycobacterium tuberculosis, Legionella pneumophila*, coronavirus, or a mixture thereof. In certain embodiments, the stream to be treated is an aqueous stream and the targeted contaminant is *E. coli*, poliovirus, *Naegleria fowleri, Legionella pneumophila*, coronavirus, or a mixture thereof. In certain embodiments, the stream to be treated is a gaseous stream and the targeted contaminant is paramyxovirus, *Mycobacterium tuberculosis*, coronavirus, or a mixture thereof. In certain embodiments, the viruses to be targeted is transmitted primarily by touch and include varicella-zoster virus (VZV), variola virus (including small pox and monkey pox).

These specific methods comprise the steps of (i) providing a particulate oxide composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof, wherein the cerium oxide is present in an amount greater than the trivalent dopant; (ii) setting a target concentration of a biological contaminant wherein the contaminant is selected from the group consisting of *E. coli*, poliovirus, coronavirus, *Naegleria fowleri*, paramyxovirus, *Mycobacterium tuberculosis, Legionella pneumophila*, coronavirus or a mixture thereof; (ii) contacting a gaseous or aqueous stream with the composition, and removing biological contaminant through contact with the composition to provide a treated stream; and (iii) monitoring the treated stream for the biological contaminant. The target concentration can be set at a certain amount of contaminant or can be set at the limit of detection. The method also can include a step of identifying the contaminant of interest prior to setting the target concentration.

The particulate oxide composition of step (i) can comprise about 0.1 wt % up to about 50 wt % trivalent dopant and have an average trivalent dopant to Ce ratio at about 0 nm to about 3.5 nm from the surface of the particulate composition that is greater than the trivalent dopant to Ce ratio at about 15 nm from the surface of the particulate composition. The particulate oxide compositions as used in this method include all of the embodiments as described supra. The particulate oxide composition of step (i) also can be provided as part of a supported composition, and as such, further comprise a support material comprising an organic polymer, cotton, glass fiber, or mixtures thereof or as part of an article comprising a supported composition.

Examples of gaseous feeds that can be treated according to the methods as disclosed herein include, among others, building ventilation systems, aircraft or vehicle ventilation systems, and ambient room air. Examples of liquid feeds that can be treated according to the methods as disclosed herein include, among others, tap water, well water, surface waters, such as water from lakes, ponds and wetlands, waters for recreational activities, agricultural waters, wastewater from industrial processes, and geothermal fluids. Examples of other uses involving physical contact with biological contaminants rather than filter, include incorporation into a plastic for a container or a plastic to be incorporated into a high touch surface, such as elevator buttons, escalator railing covers, stair railing covers, touch pads for electronic transactions, doors, door knobs, and the like. These high touch surfaces also may include glass or a mixture of glass and plastic.

The particulate oxide compositions can remove bacteria, viruses, protozoa (e.g., amoebae), fungi (e.g., mold), and other microbial contaminants, and in some embodiments remove the bacteria, viruses, protozoa (e.g., amoebae), fungi (e.g., mold), and mixtures thereof from a gaseous or liquid feed.

In one embodiment, the process is envisioned for removing biological contaminants from a gaseous or an aqueous stream using the particulate oxide compositions. The gaseous stream can be one or more of an ambient air source or more supply air for a ventilation system that contains or may contain undesirable amounts of biological and/or other contaminants. The aqueous stream can be one or more of a drinking water and groundwater source that contains or may contain undesirable amounts of biological and/or other contaminants. Furthermore, the aqueous stream can include without limitation well waters, surface waters (such as water from lakes, ponds, and wetlands, including natural and man-made and water for recreational purposes), agricultural waters, wastewater from industrial processes, and geothermal waters.

In some embodiments, the biological contaminant-containing gaseous stream is passed through an inlet into a vessel at a temperature and pressure, usually at ambient temperature and pressure, such that the gas in the biological contaminant-containing gaseous stream remains in the gaseous state. In this vessel the biological contaminant-containing gaseous stream is contacted with the particulate oxide composition. The contacting of the particulate oxide composition with the biological contaminant-containing gaseous stream removes the biological contaminant. The contacting of the particulate oxide composition with the biological contaminant-containing gaseous stream leads to removal of a measurable amount of the biological contaminant and in some embodiments removal of at least 90%, more preferably 95%, and even more preferably 99% or 99%+ of the biological contaminant. The particulate oxide composition comprises cerium oxide, trivalent dopant selected from the group consisting of yttrium (Y), lanthanum (La), neodymium (Nd), praseodymium (Pr), and mixtures thereof, and optionally an additional metal oxide selected from the group consisting of aluminum (Al), titanium (Ti), zirconium (Zr), hafnium (Hf), and mixtures thereof, wherein the cerium oxide is present in an amount greater than the trivalent dopant. In certain embodiments the particulate oxide composition comprises about 0.1 wt % up to about 50 wt % trivalent dopant and has an average trivalent dopant to Ce ratio at about 0 nm to about 3.5 nm from the surface of the particulate composition that is greater than the trivalent dopant to Ce ratio at about 15 nm from the surface of the particulate composition. The particulate oxide compositions as used in these methods including all of the embodiments as described supra.

In some embodiments, the biological contaminant-containing aqueous stream is passed through an inlet into a vessel at a temperature and pressure, usually at ambient temperature and pressure, such that the water in the biological contaminant-containing aqueous stream remains in the liquid state. In this vessel the biological contaminant-containing aqueous stream is contacted with the particulate oxide composition. The contacting of the particulate oxide composition with the biological contaminant-containing aqueous stream leads to removal of a measurable amount of the biological contaminant and in some embodiments removal of at least 90%, more preferably 95%, and even more preferably 99% or 99%+ of the biological contaminant. The particulate oxide composition comprises cerium oxide, trivalent dopant selected from the group consisting of yttrium (Y), lanthanum (La), neodymium (Nd), praseodymium (Pr), and mixtures thereof, and optionally an additional metal oxide selected from the group consisting of aluminum (Al), titanium (Ti), zirconium (Zr), hafnium (Hf), and mixtures thereof, wherein the cerium oxide is present in an amount greater than the trivalent dopant. In certain embodiments the particulate oxide composition comprises about 0.1 wt % up to about 50 wt % trivalent dopant and has an average trivalent dopant to Ce ratio at about 0 nm to about 3.5 nm from the surface of the particulate composition that is greater than the trivalent dopant to Ce ratio at about 15 nm from the surface of the particulate composition. The particulate oxide compositions as used in these methods including all of the embodiments as described supra.

In some embodiments, the trivalent doped cerium oxide particulate composition is in the form of a fixed bed. Moreover, the fixed bed containing the trivalent doped cerium oxide particulate composition normally comprises particles containing the trivalent doped cerium oxide. The trivalent doped cerium oxide particles can have a shape and/or form that exposes a maximum trivalent doped cerium oxide particle surface area to the gaseous or aqueous fluid with minimal back-pressure and the flow of the gaseous or aqueous fluid through the fixed bed. However, if desired, the trivalent doped cerium oxide particles may be in the form of a shaped body such as beads, extrudates, porous polymeric structures or monoliths. The particles include all of the embodiments of the trivalent doped cerium oxide as described supra. The trivalent doped cerium oxide particulate composition can be supported as a layer and/or coating on such beads, extrudates, porous polymeric structures or monolith supports.

Contacting of the trivalent doped cerium oxide particulate composition with a biological contaminant-containing fluid normally takes place at a temperature from about 1° C. to about 100° C., more normally from about 5° C. to about 40° C. Furthermore, the contacting of trivalent doped cerium oxide particulate composition with a biological contaminant-containing aqueous stream commonly takes place at a pH from about pH 1 to about pH 11, more commonly from about pH 3 to about pH 9. The contacting of the trivalent doped cerium oxide particulate composition with biological contaminant-containing fluid generally occurs over a period of time of more than about 30 seconds and no more than about 24 hours.

Generally, the trivalent doped cerium oxide particulate compositions can be used to treat any biological contaminant, and in particular bacteria, viruses, protozoa (e.g., amoebae), fungi, yeast, and mixtures thereof. The novel trivalent doped cerium oxide particulate compositions of the present disclosure has a number of properties (these properties are described supra) that are particularly advantageous for biological contaminant removal. Without wishing to be bound by any theory, the unique depth profile for the novel particulate oxide compositions such that there is a higher ratio of trivalent dopant to cerium on and closer to the surface may provide improved activity for removing biological contaminants.

Contacting of the particulate oxide compositions with a gaseous or aqueous stream containing the biological contaminant effectively can reduce the biological contaminant level in the gaseous or aqueous stream. Typically, the contacting of the particulate oxide composition with the biological contaminant can reduce its concentration by more than about 75%. More typically, the contacting of the particulate oxide composition with the biological contaminant can reduce its concentration by more than about 80%, more typically more than about 85%, more typically more than about 90%, more typically more than about 95%, more typically more than about 97.5%, more typically more than about 99%, and even more typically more than about 99.5%. When the biological contaminant is bacteria or mold, the % reduction can be determined by number using Colony Forming Units (CFU). When the biological contaminant is bacterial or viruses, the % reduction can be determined by Most Probable Number (MPN).

The method of treating air or water to remove biological contaminants comprises the steps of passing an air or water stream containing a first concentration of one or more undesired biological contaminants through a material, article, or supported composition comprising the particulate oxide composition and obtaining a treated air or water stream having a concentration of one or more undesired biological contaminants less than the first concentration.

In certain embodiments, the biological contaminants to be removed are viruses. After contacting with the article or supported composition comprising the particulate oxide composition, the concentration of virus can be equal to or less than a target concentration of virus. When an air or gaseous stream is to be treated, the contacted (or treated) stream has a concentration of virus equal to or less than a target concentration of virus. In particular of these embodiments, the viruses are coronavirus.

In certain embodiments, the biological contaminants to be removed are bacteria. After contacting with the article or supported composition comprising the particulate oxide composition, the concentration of bacteria can be equal to or less than a target concentration of bacteria. When an air or gaseous stream is to be treated, the contacted (or treated) stream has a concentration of bacteria equal to or less than a target concentration of bacteria. In particular of these embodiments, the bacteria are fecal coliform bacteria.

In certain embodiments, the biological contaminants to be removed are protozoa (e.g., amoebae). After contacting with the article or supported composition comprising the particulate oxide composition, the concentration of protozoa (e.g., amoebae) can be equal to or less than a target concentration of protozoa (e.g., amoebae). When an air or gaseous stream is to be treated, the contacted (or treated) stream has the concentration of protozoa (e.g. amoebae) equal to or less than a target concentration of protozoa (e.g., amoebae). In particular of these embodiments, the protozoa (e.g., amoebae) to be removed are *Naegleria fowleri* and/or *Cryptosporidium*.

In certain embodiments, the biological contaminants to be removed are fungi (e.g., mold). After contacting with the article or supported composition comprising the particulate oxide composition, the concentration of fungi can be equal to or less than a target concentration of fungi. When an air or gaseous stream is to be treated, the contacted (or treated) stream has a concentration of fungi equal to or less than a target concentration of fungi. In particular of these embodiments, the fungi to be removed are *Trichophyton mentagrophytes* and/or *Aspergillus*.

The concentration of contaminant after contacting with a supported composition or material or article comprising the particulate oxide composition can be about 45 colony forming units CFU/ml to $5 \times 10^5$ CFU/ml. The target concentration can be set at a certain amount of contaminant (e.g., virus, bacteria, amoeba, fungi) CFU per ml or can be set at the limit of detection.

In some embodiments, the particulate oxide composition per se is slurried with the biological contaminant-containing aqueous stream. It can be appreciated that the particulate oxide composition and the biological contaminant-containing aqueous stream are contacted when they are slurried. While not wanting to be bound by any theory, it is believed that some, if not most or all of the biological contaminant contained in the biological contaminant-containing aqueous stream is removed from the biological contaminant-containing aqueous stream by the slurring and/or contacting of the trivalent doped cerium oxide particulate composition with the biological contaminant-containing aqueous stream. Following the slurring and/or contacting of the particulate oxide composition with the biological contaminant-containing aqueous stream, the slurry is filtered by any known solid liquid separation method. The particulate oxide composition utilized in methods including slurrying include all of the embodiments of the particulate oxide composition as described herein, and in particular the unique depth profile.

EXAMPLES

The following Examples are provided to illustrate the trivalent doped cerium oxide composition and methods in more detail, although the scope of the invention is never limited thereby in any way.

Scanning electron microscope (SEM) images were collected using a FEG Zeiss ultra 55 (resolution 1 nm). Transmission electron microscope (TEM) images were collected using a FEI Titan Themis 200 (resolution 0.09 nm). Surface area, pore radius, and pore volume were measured by the BET/BJH method (ASTM D3663-20). The Hg-porosity and total Hg-pore volume were measured using a Micromeritics Autopore IV 9500 system. The procedures outlined in ASTM International test method D 4284-07 were followed. The particle size was measured using a Microtrac S3500. X-ray Diffraction was performed using a Bruker D2 Phaser X-Ray Diffactometer. The peak width at half height was used to determine the crystallite size. The zeta potential vs. pH was measured using a Malvern Panalytical (Zetaziser Nano ZS) ZEN3600 using a procedure similar to ASTM E2865-12(2018). As will be appreciated, crystallite sizes are measured by XRD or TEM and are the size of the individual crystals. The $D_{xx}$ sizes are the size of the particles that are made-up of the individual crystallites and is measured by laser diffraction. The temperature programmed desorption of $CO_2$ was performed as described in Hakim, A. et al. *Temperature Programmed Desorption of Carbon Dioxide for Activated Carbon supported Nickel Oxide: The Adsorption and Desorption Studies*, Advanced Materials Research, Vol. 1087 (2015) pp 45-49. The hydrogen temperature programmed reduction was performed as described in Hurst, N.

W. et al. *Temperature Programmed Reduction*. Catalysis Reviews Science and Engineering, 24:2, 233-309. Depth profilometry was performed as described in Noël, C. et al. *ToF-SIMS Depth Profiling of Organic Delta Layers with Low-Energy Cesium Ions: Depth Resolution Assessment*, Journal of The American Society for Mass Spectrometry, Vol. 30 (2019) pp 1537-1544.

Example 1

A trivalent doped cerium oxide composition was prepared by the following method. 68 g (0.297 mol) of lanthanum carbonate and 464 g (2.7 mol) cerium oxide were mixed with 200 ml of a 1.0 mol/L lanthanum nitrate solution. The ingredients were mixed for 2 hours. The mixture was then heated in a furnace to 550° C. for 2 hours to obtain 542 g of a mixed cerium lanthanum oxide which is approximately 15% lanthanum oxide by weight. This could also be called a La doped cerium oxide.

Figure 2:
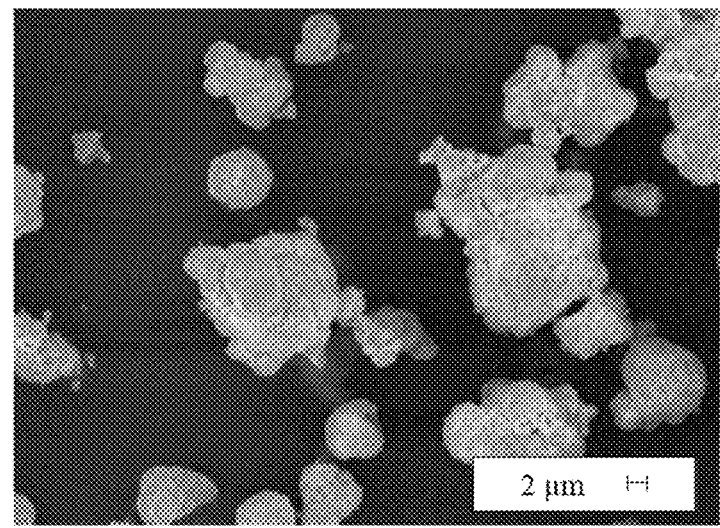
FIG. 2 is an SEM image of the composition of Example 1 with a scale bar of 2 μm.
Figure 3:
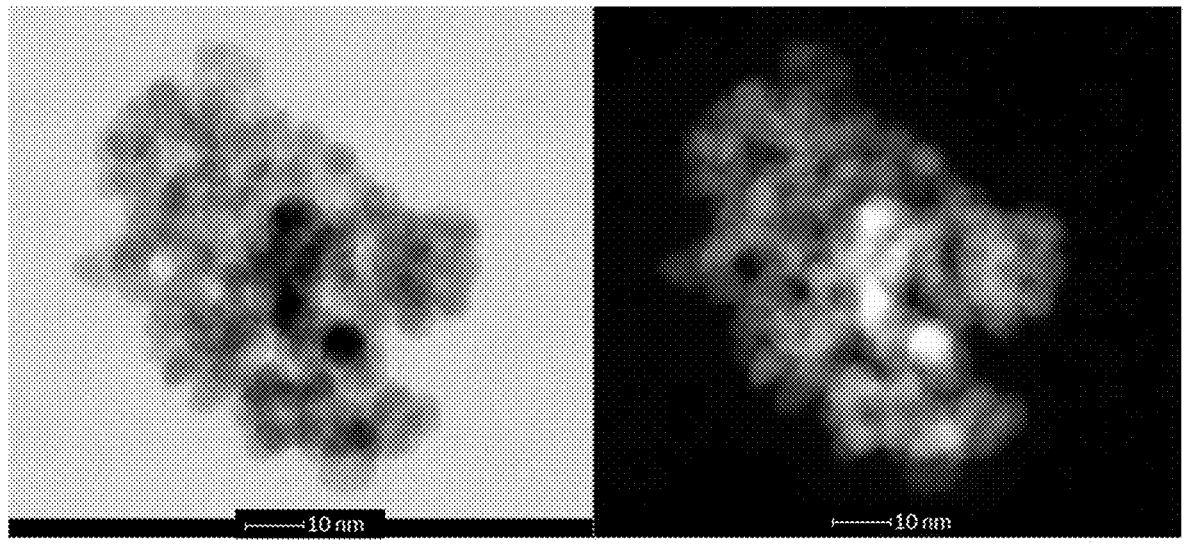
FIG. 3 is a TEM image of the composition of Example 1 with a scale bar of 10 nm. The light field images is on the left and the dark field image is on the right.
Figure 4:
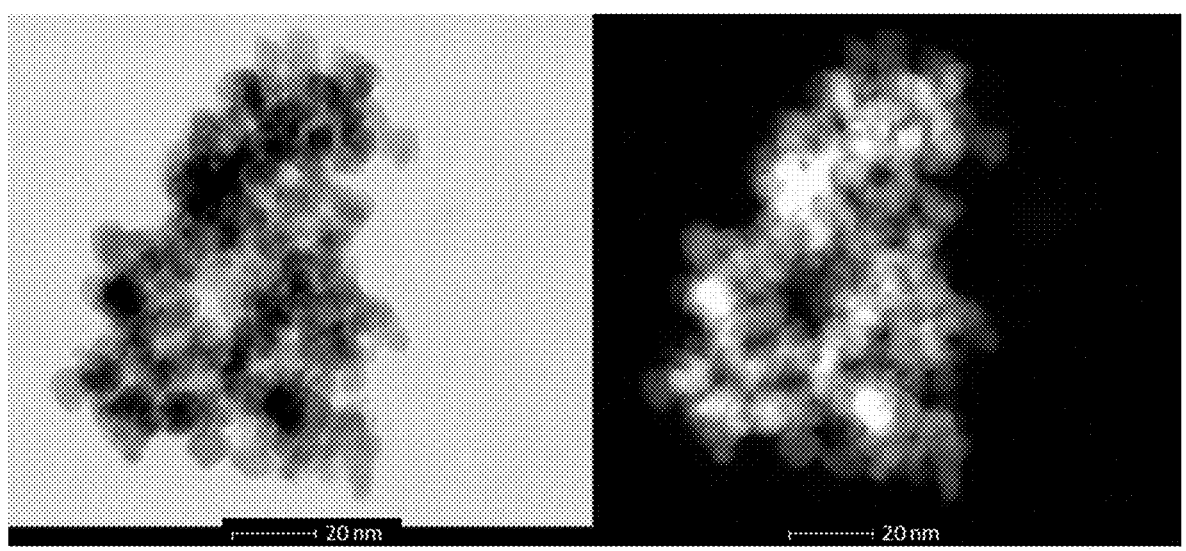
FIG. 4 is a TEM image of the composition of Example 1 with a scale bar of 20 nm. The light field images is on the left and the dark field image is on the right.

Scanning electron microscope (SEM) images for a sample of the example 1 composition were collected and are displayed in FIGS. 1 and 2. The images reveal a porous material that somewhat spherical in shape. Transmission electron microscope (TEM) images for a sample of the example 1 composition were collected and FIGS. 3 and 4 are the images. The images reveal clusters of spheres. A sample of the example 1 composition was analyzed for surface area, pore radius, and pore volume and found to be 98.332 m$^2$/g (BET) and 135.268 m$^2$/g (BJH) with a pore radius of 3.235 nm and pore volume of 0.248 cc/g. The measured Hg-porosity was measured to be 0.21 cc/g, with pore size <1 µm was 0.46 cc/g, and the total pore volume was 0.96 cc/g. The particle size distribution was measured as described above with the results being D10 3.552 µm, D50 12.1 µm, and D90 43.12 µm. The crystallite size as measured by XRD was determined to be 9.77 nm. The temperature programmed desorption profile is FIG. 5A. The desorption of $CO_2$ had 3 peak temperatures 172° C., 350° C. and 735° C. indicating both physisorption and chemisorption of $CO_2$. The $H_2$ TPR is depicted in FIG. 6 and shows an intense peak around 500° C. in stark contrast to examples 2 and 3 which had broader peaks. The zeta-potential as a function of pH is presented in FIG. 7. The isoelectric point (IEP) was found to be 8.1. The ratio of LaO$^+$ to $^{140}$CeO$^+$ as a function of depth is plotted in FIG. 8. It should be noted the LaO$^+$ to CeO$^+$ ratio is higher at shallower depths and approaches a constant level as the depth increases. This indicates the concentration of La is higher on the surface and closer to the surface for the material from Example 1. The Example 1 material is an embodiment of the trivalent doped cerium oxide having the unique depth profile.

Example 2

A trivalent doped cerium oxide composition was prepared by the following method also as described in U.S. patent application Ser. No. 17/870,068. 129 ml of a 1 mol/L Ce(NO$_3$)$_4$ solution was mixed with 24 ml of a 1 mol/L La(NO$_3$)$_3$ solution. The resulting solution was heated to reflux for at least 2 hours. 5.5 mol/L NH$_4$OH was then added to a pH of 10. The resulting solid was filtered and washed with DI water until the wash water was <15 mS/cm. The resulting powder was heated in a furnace in air at 550° C. for at least 2 hours to obtain a mixed cerium lanthanum oxide which is approximately 15% lanthanum oxide by weight. This could also be called a La doped cerium oxide.

Figure 10:
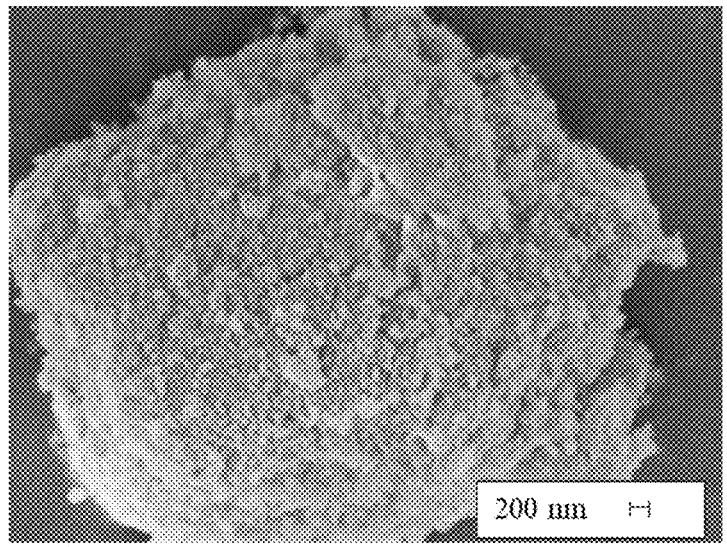
FIG. 10 is an SEM image of the composition of Example 2 with a scale bar of 200 nm.
Figure 11:
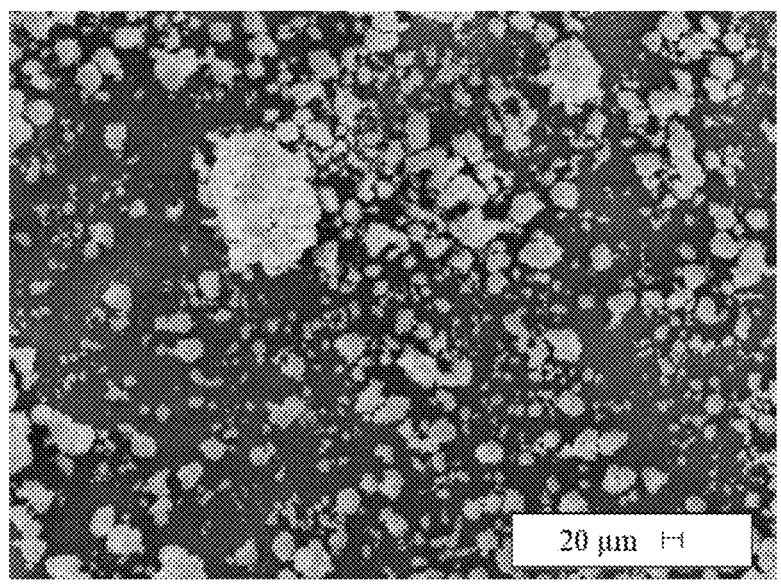
FIG. 11 is an SEM image of the composition of Example 2 with a scale bar of 20 nm.
Figure 12A:
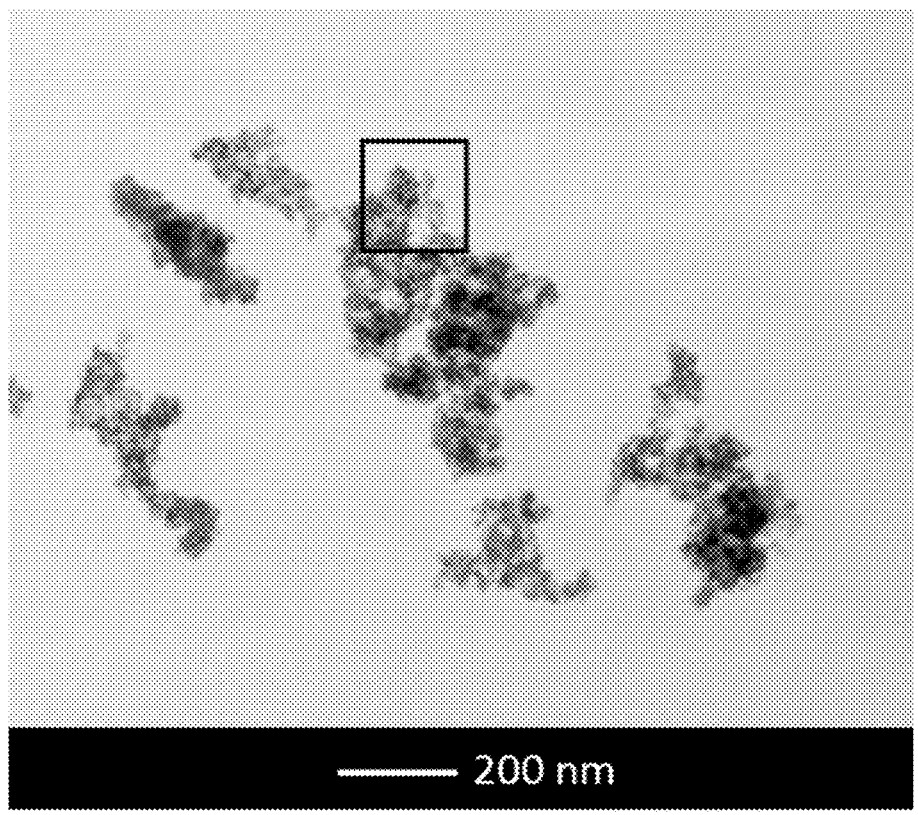
FIG. 12A is a light field TEM image of the composition of Example 2 with a scale bar of 200 nm. The box indicates the zoom area for the FIG. 12B.
Figure 12B:
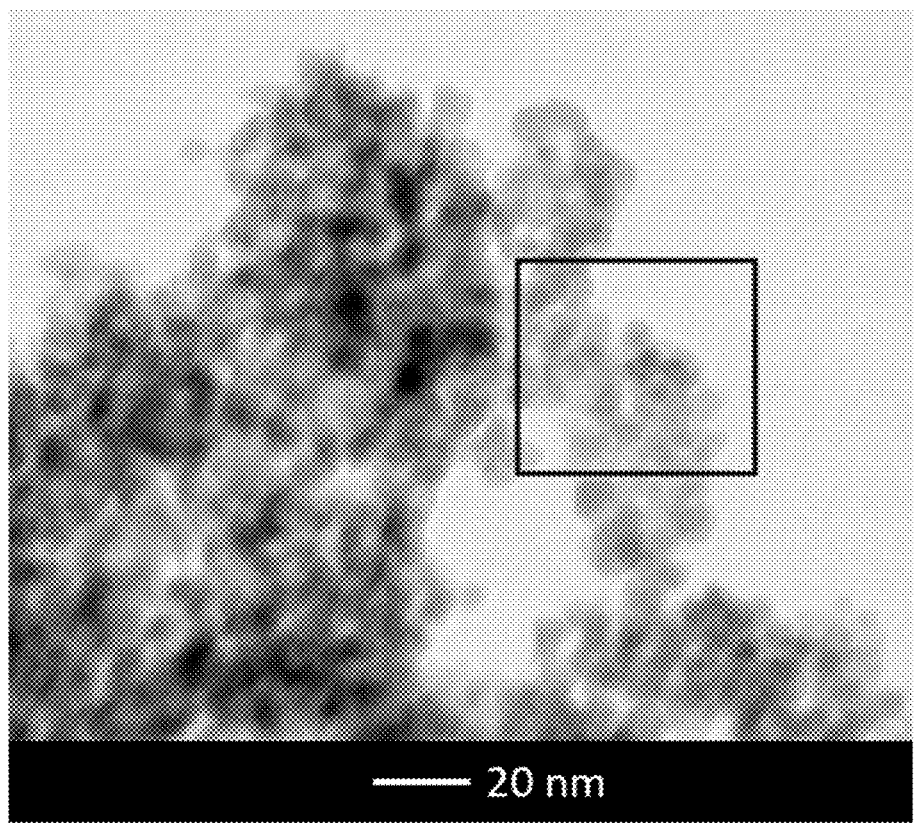
FIG. 12B is a light field TEM image of the composition of Example 2 with a scale bar of 20 nm. The box indicates the zoom area for the FIG. 12C.
Figure 12C:
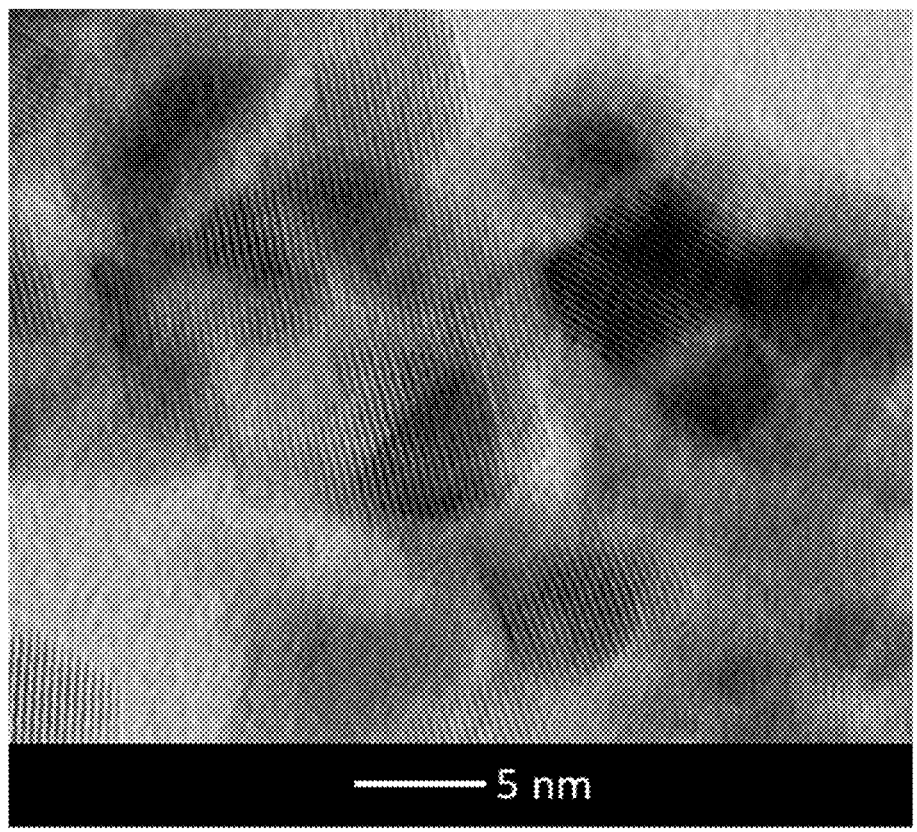
FIG. 12C is a light field TEM image of the composition of Example 2 with a scale bar of 5 nm.
Figure 12D:
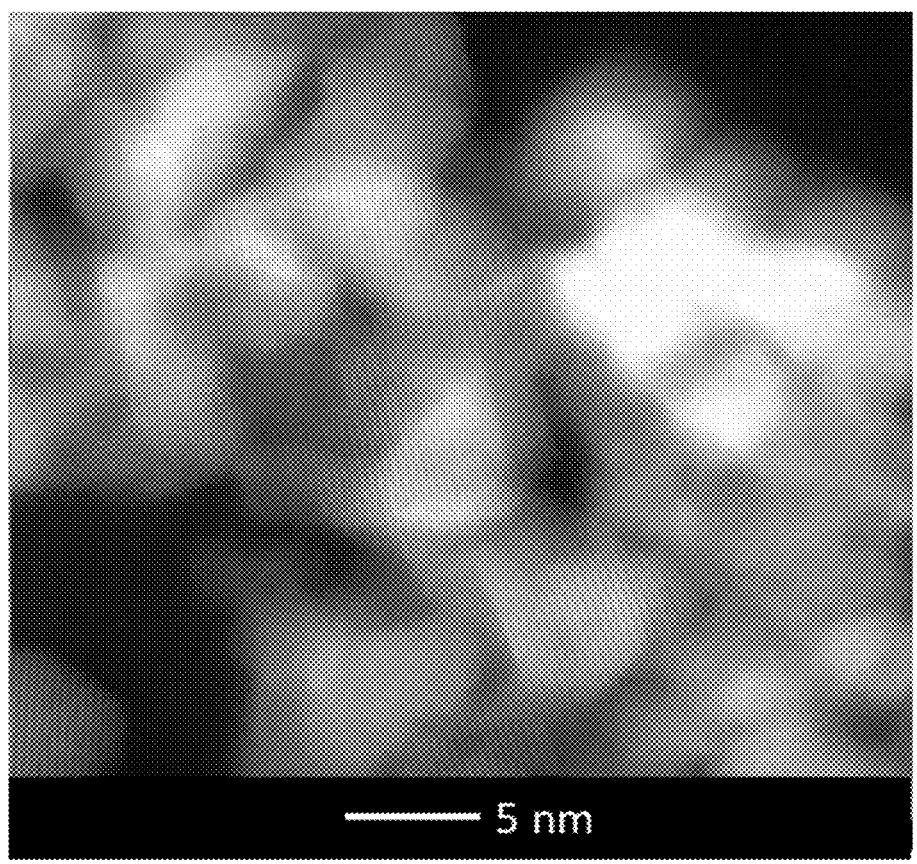
FIG. 12D is a dark field TEM image of the composition of Example 2 with a scale bar of 5 nm.

FIGS. 10 and 11 are the SEM images. The images reveal a porous material that somewhat spherical in shape. FIGS. 12A-12D contains the TEM images. The images reveal clusters of spheres and diffraction planes can be seen. The surface area was found to be 120.464 m$^2$/g (BET) and 143.087 m$^2$/g (BJH) with a pore radius of 3.245 nm and pore volume of 0.285 cc/g. The measured pore volume with pore size <0.1 µm was measured to be 0.23 cc/g, with pore size <1 µm was 0.45 cc/g, and the total pore volume was 0.99 cc/g. The particle size distribution was measured as described above with the results being D10 1.301 µm, D50 5.545 µm, and D90 13.109 µm. The crystallite size as measured by XRD was determined to be 9.03 nm. The temperature programmed desorption profile is FIG. 5B. The desorption of $CO_2$ had 1 peak temperature at 175° C. indicating only physisorption of $CO_2$. Any peaks at higher temperatures are not distinguished from the background and thus chemisorption of $CO_2$ is not detected. The $H_2$ TPR is depicted in FIG. 6 and shows a broad peak around 566° C. The zeta-potential as a function of pH is presented in FIG. 7. The isoelectric point (IEP) was found to be 7.34.

The ratio of LaO$^+$ to $^{140}$CeO$^+$ as a function of depth is plotted in FIG. 8. It should be noted this material has a near constant LaO$^+$ to CeO$^+$ ratio from the surface to the maximum measured depth. This indicates the concentration of La is nearly the same on the surface as it is at depth.

Example 3

A cerium (IV) oxide composition was prepared by the following method. In a closed, stirred container a one liter of a 0.12 M cerium (IV) ammonium nitrate solution was prepared from cerium (IV) ammonium nitrate crystals dissolved in nitric acid and held at approximately 90° C. for about 24 hours. In a separate container 200 ml of a 3M ammonium hydroxide solution was prepared and held at room temperature. Subsequently the two solutions were combined and stirred for approximately one hour. The resultant precipitate was filtered using Büchner funnel equipped with filter paper. The solids were then thoroughly washed in the Büchner using deionized water. Following the washing/filtering step, the wet hydrate was calcined in a muffle furnace at approximately 450° C. for three hours to form the cerium (IV) oxide composition.

The surface area was found to be 126 m$^2$/g (BET) and 167 m$^2$/g (BJH) with a pore radius of 3.62 nm and pore volume of 0.309 cc/g. The measured pore volume with pore size <0.1 µm was measured to be 0.24 cc/g, with pore size <1 µm was 0.35 cc/g, and the total pore volume was 0.85 cc/g. The particle size distribution was measured as described above with the results being D10 2 µm, D50 9 µm, and D90 25 µm. The crystallite size as measured by XRD was determined to be 8.43 nm. The temperature programmed desorption profile is FIG. 5C. The desorption of $CO_2$ had 1 peak temperature at 175° C. indicating only physisorption of $CO_2$. Any peaks at higher temperatures are not distinguished from the background and thus chemisorption of $CO_2$ is not detected. The $H_2$ TPR is depicted in FIG. 6 and shows broad peaks around 500 and 900° C. The zeta-potential as a function of pH is presented in FIG. 7. The isoelectric point (IEP) was found to be 7.22.

Depth profilometry was not performed as Ce was the only component in this sample. This sample contained no trivalent dopant.

Example 4

A trivalent doped cerium oxide composition was prepared by the following method. In a closed, stirred container a one liter of a 0.12 M cerium (IV) ammonium nitrate solution was prepared from cerium (IV) ammonium nitrate crystals dissolved in nitric acid. To this was added 199.5 g (0.5 mol) commercially available $Al(NO_3)_3$ and held at approximately 90° C. for about 24 hours. In a separate container 200 ml of a 3M ammonium hydroxide solution was prepared and held at room temperature. Subsequently the two solutions were combined and stirred for approximately one hour. The resultant precipitate was filtered using Bückner 2× funnel equipped with filter paper. The solids were then thoroughly washed in the Bückner 2× using deionized water. Following the washing/filtering step, the wet hydrate was calcined in a muffle furnace at approximately 450° C. for three hours to form an aluminum cerium (IV) oxide composition. This oxide was suspended in a Praseodymium nitrate solution containing Praseodymium carbonate. The Pr to aluminum cerium (IV) oxide ratio was varied to achieve a 4%, 8%, 12% or 20% loading of Pr oxide on the final product. The ingredients were mixed for 2 hours. The mixture was then heated in a furnace to 550° C. for 2 hours to obtain a mixed cerium aluminum praseodymium oxide. This could also be called a Pr doped cerium oxide.

Figure 9:
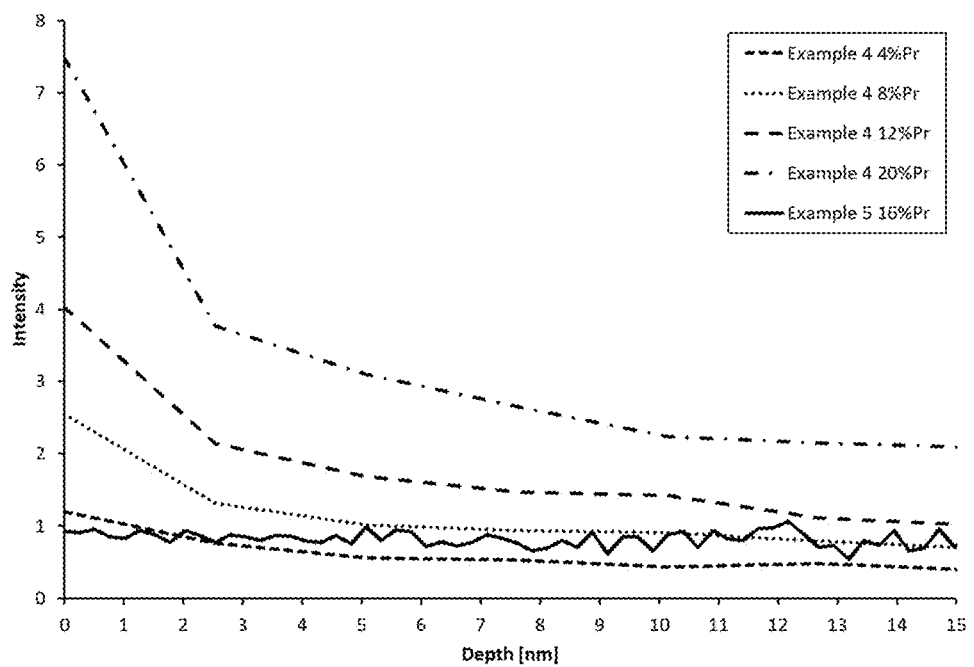
FIG. 9 is a graph of the ratio of $PrO^+/CeO^+$ vs depth for the compositions of Example 4 and Example 5.

The depth profile of each of these materials was then measured and the $PrO^+$ to $^{140}CeO^+$ ratio vs depth is presented in FIG. 9. As with Example 1 the trivalent, in this case $PrO^+$, to $^{140}CeO^+$ ratio is higher at the surface and shallower depths and approaches a constant level as the depth increases. The Example 4 materials are embodiments of the trivalent doped cerium oxide having the unique depth profile.

Example 5

A praseodymium doped cerium oxide composition was prepared by the following method. This method is similar to the method of Example 2. 129 ml of a 1 mol/L $Ce(NO_3)_4$ solution was mixed with 82 ml of a 1 mol/L $Pr(NO_3)_3$ solution and 63.9 g (0.3 mol) commercially available $Al(NO_3)_3$. The resulting solution was heated to reflux for at least 2 hours. 5.5 mol/L $NH_4OH$ was then added to a pH of 10. The resulting solid was filtered and washed with DI water until the wash water was <15 mS/cm. The resulting powder was heated in a furnace in air at 550° C. for at least 2 hours to obtain a mixed cerium aluminum praseodymium oxide which contains approximately 16% Pr oxide by weight. This could also be called a Pr doped cerium oxide.

The depth profile was measured and the data is presented in FIG. 9. As in example 2 the trivalent, in this case $PrO^+$, to $^{140}CeO^+$ ratio is nearly constant from the surface to the maximum depth measured. This indicates the concentration of Pr is nearly the same on the surface as it is at depth.

The depth profile data from examples 1, 2, 4 and 5 were then compared by averaging the trivalent to Ce ratio ($LaO^+/CeO^+$ or $PrO^+/CeO^+$) at depths of 0 to 3.5 nm. This average was then compared to the same ratio at a depth of 15 nm. The % increase was then calculated ((Average between 0 and 3.5 nm)−(ratio at 15 nm))/(ratio at 15 nm)×100.

TABLE 1

Comparison of average $LaO^+/CeO^+$ or $PrO^+/CeO^+$ ratio from 0 to 3.5 nm vs ratio at 15 nm

| Material | Average ratio from 0 to 3.5 nm | Ratio at 15 nm | % increase |
|---|---|---|---|
| Example 1 | 0.3386 | 0.2548 | 32.9 |
| Example 2 | 0.2826 | 0.2638 | 7.15 |

TABLE 1-continued

Comparison of average $LaO^+/CeO^+$ or $PrO^+/CeO^+$ ratio from 0 to 3.5 nm vs ratio at 15 nm

| Material | Average ratio from 0 to 3.5 nm | Ratio at 15 nm | % increase |
|---|---|---|---|
| Example 4 @4% | 0.9793 | 0.3929 | 149 |
| Example 4 @8% | 1.9280 | 0.6920 | 178 |
| Example 4 @12% | 3.0797 | 1.0156 | 203 |
| Example 4 @20% | 5.6259 | 2.0905 | 169 |
| Example 5 | 0.0386 | 0.0529 | −27 |

Example 6

Viral Removal Characteristics of the composition of Example 1 and Example 3. A quantitative suspension test for the evaluation of virucidal activity in the medical area was performed. An enveloped DNA virus—vaccinia, a coronavirus surrogate, was selected for screening and comprised a cell culture medium of: Eagle's Minimum Essential Medium (EMEM)+10% FBS+2% Pen/Strep (Culture Media), EMEM+2% FBS+2% FCS+1% Pen/Strep (Viral Media). The test material concentration was 0.1±0.01 g/mL-1 and distilled water was used as the diluent. The suspended powder was liquid vortexed to uniformity. Contact analysis across two soak times of 30±5 minutes was conducted. The test temperature was maintained at 20±2° C. with an incubation condition of 37±2° C. and 5% $CO_2$. There were no interfering substances and the test products appeared normal and stable. The activity suppression method was one of dilution in ice-cold medium to remove passive settling. No filtration was used.

TABLE 2

Reduction of Vaccinia.

| Material | Contact time | % Reduction | Log reduction |
|---|---|---|---|
| Example 1 | 30 mins | 99.766% | 2.63 |
| Example 3 | 30 mins | 90% | 1 |

Example 7

Viral Removal Characteristics of the composition of Example 1 and a commercially available Silver Zinc Zeolite antimicrobial (CAS #130328-20-0) material were tested using an adapted EN 14476 method. Suspensions of these materials (0.2 g/ml in deionized water) in the amount of 4 ml were added to a mixture of 0.5 ml Vaccinia virus (ATCC® VR-1508™) suspension and 0.5 ml hard water at room temperature (20±1° C.). At the indicated times (1 and 4 hrs), 0.5 ml of the test mixture was placed into 4.5 ml ice-cold EMEM and the mixture was left in an ice bath for 30 min±10 sec. Samples were put through a MicroSpin™ S-400 HR column in two 100 μL aliquots. Flow through was treated with PMAxx™ dye and activated with a PMA-Lite™ LED Photolysis Device. Following kit instructions, nucleic acids was extracted from the PMAxx™ treated virus. Quantitative PCR was performed with the extracted nucleic acid using a SYBR green detection system.

TABLE 3

Reduction of Vaccinia.

| Material | Contact time | % Reduction | Log Reduction |
|---|---|---|---|
| Example 1 | 1 hr | 98.440% | 1.81 |
|  | 4 hrs | 98.550% | 1.84 |
| Silver Zinc Zeolite | 1 hr | 95.164% | 1.32 |
|  | 4 hrs | 91.731% | 1.08 |

Example 8

Bacterial Removal Characteristics of the composition of Example 1 and a commercially available Silver Zinc Zeolite antimicrobial material (CAS #130328-20-0) were tested using an adapted EN 13727 method. Suspensions of these materials (0.2 g/ml in deionized water) in the amount of 4 ml were added to a mixture of 0.5 ml Methicillin resistant *Staphylococcus aureus* (MRSA) ATCC® 43300™ suspension and 0.5 ml hard water at room temperature (20±1° C.). Subsequently, 0.5 mL of mixture was transferred to a tube containing 4 mL neutralizer (Dey Engley broth) and incubated for 5 min±10 s at 20° C.±1° C. Validation suspension (0.5 mL) was then added to each neutralizer tube, mixed, and incubated at 20° C.±1° C. for 30 min±1 min. Suspensions were plated on TSA and assessed for efficacy and toxicity.

TABLE 4

Reduction of MRSA.

| Material | Contact time | % Reduction | Log Reduction |
|---|---|---|---|
| Example 1 | 1 hr | 99.753% | 2.61 |
| Silver Zinc Zeolite | 1 hr | 99.176% | 2.08 |

Example 9

Relative bacterial removal characteristics were measured by the following procedure. On the day of the study, the bacteria culture was examined for purity and concentration. The referenced bacteria (*Escherichia coli*) was homogenized for 30 seconds and allowed a 15-minute rest. The microbial challenge was checked for purity, and then diluted in phosphate buffered saline (PBS). The test was then performed in duplicate as follows: One hundred microliters of a single diluted bacterial species suspension was added to a 50 ml conical tube (Corning) containing 0.25 g of the test material suspended in 25 mL of Sterile DI Water and a NIST traceable laboratory timer was started immediately. The mixture was homogenized at medium speed by vortexing periodically for a total contact time of 5-minutes. Immediately following, 1 mL of the sample was transferred to a fresh 50 mL tube containing 9 mL of D/E Neutralizing Broth (Criterion) and homogenized. The samples were analyzed on the day of the study directly and at various dilutions in replicates of at least 2. Positive and negative controls were performed along with the test subjects to provide quality control and reference data as per laboratory standard accredited ISO17025:2017 methodology. Bacteria were analyzed and enumerated as Colony Forming Units (CFU) on the respective media as per SM 9215C. The respective percent reductions were determined based on the recovery of the positive controls and test samples and normalized on a log scale relative to Comparative example 2 for the purpose of comparing the materials performance.

TABLE 5

Relative performance of materials against *E. coli*.

| Material | Relative performance |
|---|---|
| Example 3 | — |
| Example 2 | 4.0x |
| Example 1 | 13.8x |

Example 10

Relative bacterial removal characteristics were measured by the following procedure. An aliquot of OC43 virus was added to Sterile DI Water and homogenized. 25 mL of the prepared test water was added to a 50 mL conical tubes (Corning) containing 0.25 g of the test material and a NIST traceable laboratory timer was started immediately. The mixture was homogenized at medium speed on an orbital shaker a total contact time of 30-minutes. Immediately following, 1 mL of the sample was transferred to a fresh 50 mL tube containing 9 mL of D/E Neutralizing Broth (Criterion) and homogenized. The recovery control consisted of a sterile tube containing 25 mL of test water that was homogenized and treated in the same manner as the test substances. The samples analyzed on the day of the study directly and at various dilutions in replicates of at least 5. Positive and negative controls were performed along with the test subjects to provide quality control and reference data as per laboratory standard accredited ISO17025:2017 methodology. Human Coronavirus OC43 (ATCC VR-1558) virus was propagated and enumerated as Most Probable Numbers (MPN) using human ileocecal colorectal adenocarcinoma HCT-8 cell line (ATCC CCL-244) as the host. Cells were grown in 6-well plates cell culture flasks. For enumeration, virus was enumerated as infectious units as per the assay methodology described in Standard Method 9510 (APHA, 2012); the methodology is equivalent to EPA/600/R-95/178 and the updated EPA/600/4-84/013. Briefly, aliquots of a sample containing the virus were inoculated on freshly prepared monolayers of HCT8 cells (approximately 90% confluence). Each sample volume was inoculated in replicates of five. The cells were then incubated in Dulbecco's Modified Eagle's medium (dMEM, Mediatech Inc, USA) media 2% Fetal Bovine Serum (FBS, Mediatech, USA) at 35° C. and 5% $CO_2$ for 8-10 days. Cells were microscopically monitored routinely for signs of degeneration. Cells in flasks demonstrating signs of infectivity (Cytopathic effects; CPE) were recorded as positive (+) and those that did not demonstrate CPE were recorded as negative (−). The most probable number of infectious virus in a sample was then calculated using MPNCALC software (version 0.0.0.23). The respective percent reductions were determined based on the recovery of the positive controls and test samples. The respective percent reductions were determined based on the recovery of the positive controls and test samples and normalized on a log scale relative to Comparative example 2 for the purpose of comparing the materials performance.

TABLE 6

Relative performance of materials against OC43 virus.

| Material | Relative performance |
|---|---|
| Example 3 | — |
| Example 2 | 5.1x |
| Example 1 | 9.4x |

Example 11

The material of example 1 is suspended in deionized water and a binder, such as citric acid, is added to the water. A substrate, such as cotton fabric, is then immersed in the suspension at least one time. After removing the substrate, it is allowed to dry. The resulting fabric has a coating of the composition of example 1 its surface. This coated fabric is then placed in a funnel such that fabric will remain in the funnel when water is passed through. Water contaminated with E. coli is then poured into the funnel and comes in contact with the coated fabric. The water collected from the funnel is analyzed and found to have a reduced concentration of E. coli.

Example 12

The material of example 1 is suspended in deionized water and a binder, such as citric acid, is added to the water. A substrate, such as cotton fabric, is then immersed in the suspension at least one time. After removing the substrate, it is allowed to dry. The resulting fabric has a coating of the composition of example 1 its surface. This coated fabric is then placed on an air filter such that fabric covers the face of the air filter and air can pass though the fabric. The filter is then placed in an HVAC or room air filtration unit. Upon turning on the unit, air contaminated with coronavirus is passed through the filter. The air discharged from the unit is analyzed and found to have a reduced concentration of coronavirus.

Example 13

Polyethylene granules or powder is mechanically mixed with the material of example 1 such that the material of example 1 is approximately 1% by weight. The mixture is then fed into a heating chamber to form an end use product such as a bottle. After the bottle is formed from the polyethylene containing material from example 1, the surface to the polyethylene is tested for antibacterial or bacteriostatic properties by exposing the surface to E. coli. The surface is then analyzed for E. coli and found to have less colony forming units than a control. Another test is conducted by putting pasteurized milk in the formed bottle and observing the time necessary for the milk to spoil. Compared a polyethylene bottle without the material of example 1, the milk takes a longer time to spoil.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

It will be clear that the compositions and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A particulate oxide composition comprising:
   cerium oxide;
   trivalent dopant selected from the group consisting of yttrium (Y), lanthanum (La), neodymium (Nd), praseodymium (Pr), and mixtures thereof; and
   optionally an additional metal oxide selected from the group consisting of aluminum (Al), titanium (Ti), zirconium (Zr), hafnium (Hf), and mixtures thereof;
   wherein the cerium oxide is present in an amount greater than the trivalent dopant and wherein the average trivalent dopant to Ce ratio at about 0 nm to about 3.5 nm from the surface of the particulate oxide composition is greater than the trivalent dopant to Ce ratio at about 15 nm from the surface of the particulate composition.

2. The particulate oxide composition of claim 1 comprising:
   cerium oxide in an amount of about 99.9 wt % to about 20 wt % based on the total weight of the particulate oxide composition;
   trivalent dopant in an amount of about 0.1 wt % up to about 50 wt % based on the total weight of the particulate oxide composition; and
   additional metal oxide in an amount of about 70 wt % to about 0 wt % based on the total weight of the particulate oxide composition.

3. The particulate oxide composition of claim 1 comprising:
   cerium oxide in an amount of about 99.9 wt % to about 50 wt % based on the total weight of the particulate oxide composition; and
   trivalent dopant in an amount of about 0.1 wt % up to about 50 wt % based on the total weight of the particulate oxide composition.

4. The particulate oxide composition of claim 1 comprising:
   cerium oxide in an amount of about 20 wt % to about 30 wt % based on the total weight of the particulate oxide composition;

trivalent dopant in an amount of about 2 wt % to about 25 wt % based on the total weight of the particulate oxide composition; and additional metal oxide in an amount of about 45 wt % to about 78 wt % based on the total weight of the particulate oxide composition.

5. The particulate oxide composition of claim 1 comprising:
cerium oxide in an amount of about 45 wt % to about 78 wt % based on the total weight of the particulate oxide composition;
trivalent dopant in an amount of about 2 wt % to about 25 wt % based on the total weight of the particulate oxide composition; and
additional metal oxide in an amount of about 20 wt % to about 30 wt % based on the total weight of the particulate oxide composition.

6. The particulate oxide composition of claim 1, wherein the average trivalent dopant to Ce ratio at about 0 nm to about 3.5 nm from the surface of the particulate composition is about 10% to about 250% greater than the trivalent dopant to Ce ratio at about 15 nm from the surface of the particulate oxide composition.

7. The particulate oxide composition of claim 1, wherein the average trivalent dopant to Ce ratio at about 0 nm to about 3.5 nm from the surface of the particulate composition is about 15% to about 250% greater than the trivalent dopant to Ce ratio at about 15 nm from the surface of the particulate oxide composition.

8. The particulate oxide composition of claim 1, comprising about 2 wt % to about 30 wt % trivalent dopant.

9. The particulate oxide composition of claim 1, wherein the composition exhibits chemisorption and physisorption of $CO_2$.

10. A supported composition for removing biological contaminants comprising:
a support material comprising an organic polymer, cotton, glass fiber, or mixtures thereof; and the particulate oxide composition of claim 1,
wherein the particulate oxide composition of claim 1 is deposited on or within the support material.

11. The supported composition of claim 10, wherein the support material is an organic polymer selected from the group consisting of polyethylene, polyvinyl chloride, nylon, polypropylene, polyester, polyurethane, polyamide, polyolefin, polycarbonate, copolymers thereof, and mixtures thereof.

12. The supported composition of claim 10, wherein the support material is cotton.

13. The supported composition of claim 10, wherein the supported composition comprises about 0.5 to about 80 weight % of the particulate oxide composition based on the total weight of the supported composition.

14. The supported composition of claim 10, wherein the supported composition is a filter material or a plastic.

15. A method for removing biological contaminants comprising:
providing a particulate oxide composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant and wherein the average trivalent dopant to Ce ratio at about 0 nm to about 3.5 nm from the surface of the particulate oxide composition is greater than the trivalent dopant to Ce ratio at about 15 nm from the surface of the particulate composition;

contacting the composition with a biological contaminant wherein the biological contaminant is selected from the group consisting of bacteria, viruses, protozoa, fungi, and mixtures thereof; and removing at least about 90% of the biological contaminant through contact with the composition.

16. The method of claim 15, wherein the particulate oxide composition is contained within a filter material or a plastic.

17. The method of claim 15, wherein the particulate oxide composition is deposited on or within a support material comprising an organic polymer, cotton, glass fiber, or mixtures thereof.

18. The method of claim 15, wherein the composition removes approximately 99% or more of the biological contaminants.

19. The method of claim 15, wherein the biological contaminant is in an aqueous stream.

20. The method of claim 15, wherein the biological contaminant is in a gaseous stream.

21. The method of claim 15, wherein the contacting is through touch of a solid to an article comprising the particulate oxide composition.

22. The method of claim 15, further comprising the steps of setting a target concentration of biological contaminant and monitoring after contacting for the biological contaminant.

23. A method for treating a fluid comprising:
(i) providing a particulate oxide composition comprising cerium oxide; trivalent dopant selected from the group consisting of yttrium (Y), lanthanum (La), neodymium (Nd), praseodymium (Pr), and mixtures thereof; and optionally an additional metal oxide selected from the group consisting of aluminum (Al), titanium (Ti), zirconium (Zr), hafnium (Hf), and mixtures thereof; wherein the cerium oxide is present in an amount greater than the trivalent dopant and wherein the average trivalent dopant to Ce ratio at about 0 nm to about 3.5 nm from the surface of the particulate oxide composition is greater than the trivalent dopant to Ce ratio at about 15 nm from the surface of the particulate composition;
(ii) contacting a gaseous or aqueous stream containing biological contaminant with the composition, wherein the biological contaminant is selected from the group consisting of bacteria, viruses, fungi, protozoa, and mixtures thereof; and
(iii) removing biological contaminant from the gaseous or aqueous stream through contact with the composition.

24. The method of claim 23, wherein the particulate oxide composition is deposited on or within a support material comprising an organic polymer, cotton, glass fiber, or mixtures thereof.

25. A plastic article comprising:
(a) a supported composition for removing biological contaminants comprising: an organic polymer selected from the group consisting of polyethylene, polyvinyl chloride, nylon, polypropylene, polyester, polyurethane, polyamide, polyolefin, polycarbonate, copolymers thereof, and mixtures thereof; and the particulate oxide composition of claim 1, wherein in the supported composition, the particulate composition is deposited on or within the organic polymer; and wherein the plastic article comprises about 50 to about 100 weight percent of the supported composition for removing biological contaminants based on the total weight of the plastic article.

* * * * *